(12) United States Patent
Kang et al.

(10) Patent No.: US 11,661,700 B2
(45) Date of Patent: May 30, 2023

(54) CLOTHES TREATMENT APPARATUS

(71) Applicant: LG ELECTRONICS INC., Seoul (KR)

(72) Inventors: Hyungha Kang, Seoul (KR); Jaehyung Kim, Seoul (KR); Semin Jang, Seoul (KR); Joosik Jung, Seoul (KR)

(73) Assignee: LG Electronics Inc., Seoul (KR)

(*) Notice: Subject to any disclaimer, the term of this patent is extended or adjusted under 35 U.S.C. 154(b) by 368 days.

(21) Appl. No.: 16/770,448

(22) PCT Filed: Dec. 7, 2018

(86) PCT No.: PCT/KR2018/015551
§ 371 (c)(1),
(2) Date: Jun. 5, 2020

(87) PCT Pub. No.: WO2019/112382
PCT Pub. Date: Jun. 13, 2019

(65) Prior Publication Data
US 2020/0385915 A1  Dec. 10, 2020

(30) Foreign Application Priority Data

Dec. 8, 2017 (KR) .................... 10-2017-0168510
Dec. 8, 2017 (KR) .................... 10-2018-0148691

(51) Int. Cl.
*D06F 58/10* (2006.01)
*B01D 46/00* (2022.01)
(Continued)

(52) U.S. Cl.
CPC .......... *D06F 58/10* (2013.01); *B01D 46/0041* (2013.01); *B01D 46/4272* (2013.01);
(Continued)

(58) Field of Classification Search
CPC .......... D06F 58/10; D06F 58/22; D06F 87/00; D06F 58/44; D06F 73/02; D06F 2103/68;
(Continued)

(56) References Cited

U.S. PATENT DOCUMENTS

2003/0014880 A1   1/2003  Baurmann
2016/0083894 A1*  3/2016  Bison ................. D06F 58/22
                                            34/85
2017/0191208 A1*  7/2017  Kim .................... D06F 25/00

FOREIGN PATENT DOCUMENTS

AU     2009271889 A1 *  2/2011  ............. D06F 58/10
CN       103080410 A    5/2013
(Continued)

OTHER PUBLICATIONS

Office Action, dated Feb. 25, 2021, issued in Korean Patent Application No. 10-2018-0148691 (11 pages).
(Continued)

*Primary Examiner* — Dung H Bui
(74) *Attorney, Agent, or Firm* — Birch, Stewart, Kolasch & Birch, LLP

(57) ABSTRACT

A clothes treatment apparatus comprises: a cabinet forming a treatment space for storing clothes; a filter module having a filter portion for filtering out dust from air; an air flow path having a plurality of preset flow paths for directing air to be discharged into the treatment space; a fan for moving the air in the air flow path; a single valve disposed on the air flow path, that changes the air flow path by rotating around a predetermined rotational axis; a valve actuating module for rotating the valve; and a control part for controlling the angle of rotation of the valve to select one of the plurality of flow paths. The plurality of flow paths comprise: at least one bypass flow path for directing the air to bypass the filter (Continued)

portion; and at least one filtering flow path for directing the air to pass through the filter portion.

19 Claims, 12 Drawing Sheets

(51) Int. Cl.
  *B01D 46/42* (2006.01)
  *D06F 58/22* (2006.01)
  *D06F 87/00* (2006.01)
(52) U.S. Cl.
  CPC .............. *D06F 58/22* (2013.01); *D06F 87/00* (2013.01); *B01D 2279/55* (2013.01)
(58) Field of Classification Search
  CPC .. D06F 2105/32; D06F 2105/34; D06F 58/20; D06F 58/30; B01D 46/0041; B01D 46/4272; B01D 2279/55; B01D 46/42
  See application file for complete search history.

(56) References Cited

FOREIGN PATENT DOCUMENTS

| CN | 104131443 | A | | 11/2014 | |
| --- | --- | --- | --- | --- | --- |
| CN | 104603350 | A | * | 5/2015 | ........... D06F 58/206 |
| CN | 105544164 | A | | 5/2016 | |
| CN | 105908463 | A | * | 8/2016 | |
| EP | 1277872 | A2 | | 1/2003 | |
| FR | 2408004 | A1 | | 6/1979 | |
| JP | H04-84997 | A | | 3/1992 | |
| JP | H04-327900 | A | | 11/1992 | |
| JP | H08-276098 | A | | 10/1996 | |
| JP | 2001-208413 | A | | 8/2001 | |
| JP | 2004-154321 | A | | 6/2004 | |
| JP | 2011-167221 | A | | 9/2011 | |
| JP | 2016-093415 | A | | 5/2016 | |
| JP | 2016165357 | A | | 9/2016 | |
| KR | 10-2006-0074377 | | | 7/2006 | |
| KR | 10-2011-0082375 | | | 7/2011 | |
| KR | 10-2013-0060595 | | | 6/2013 | |
| KR | 10-2013-0064225 | | | 6/2013 | |
| KR | 10-2014-0114649 | | | 9/2014 | |
| WO | WO-2009121754 | A1 | * | 10/2009 | .............. D06F 58/02 |
| WO | WO-2009132942 | A1 | * | 11/2009 | .............. D06F 58/00 |

OTHER PUBLICATIONS

PCT International Search Report, dated Apr. 9, 2019, issued in International Application No. PCT/KR2018/015551 (14 pages).
European Search Report, dated Aug. 16, 2021, issued in Patent Application No. 18886358.3 (9 pages).
Office Action, dated Sep. 10, 2021, issued in Korean Patent Application No. 10-2021-0110333 (6 pages).
Notice of Allowance, dated May 20, 2021, issued in Korean Patent Application No. 10-2019-0079315 (1 page).

* cited by examiner

CLOTHES TREATMENT APPARATUS

TECHNICAL FIELD

The present disclosure relates to an air flow path structure in a clothes treatment apparatus.

BACKGROUND

A clothes treatment apparatus refers to all kinds of apparatuses for maintaining or treating clothes, such washing, drying, and dewrinkling them, at home or at a laundromat. Examples of clothes treatment apparatuses include a washer for washing clothes, a dryer for drying clothes, a washer-dryer which performs both washing and drying functions, a refresher for refreshing clothes, and a steamer for removing unnecessary wrinkles in clothes.

More specifically, the refresher is a device used for keeping clothes crisp and fresh, which performs functions like drying clothes, providing fragrance to clothes, preventing static cling on clothes, removing wrinkles from clothes, and so on. The steamer is generally a device that provides steam to clothes to remove wrinkles from them, which can remove wrinkles from clothes in a more delicate way, without the hot plate touching the clothes like in traditional irons. There is a known clothes treatment apparatus equipped with both the refresher and steamer functions, that functions to remove wrinkles and smells from clothes put inside it by using steam and hot air.

There is also a known apparatus that comes with a rack for hanging clothes in a treatment chamber, and that provides steam into the treatment chamber where the clothes are hung or provides hot air while circulating the air in the treatment chamber.

Technical Problem

One of the problems with the conventional art is that it only allows limited functional versatility when it comes to combining each component's functions and various air flow paths. A first aspect of the present disclosure is to solve this problem.

Another problem with the conventional art is that it is difficult to remove ultrafine dust clinging to clothes. A second aspect of the present disclosure is to solve this problem.

A third aspect of the present disclosure is to provide a clothes treatment apparatus with greater functional versatility by providing outside air to clothes as necessary.

A fourth aspect of the present disclosure is to provide an efficient structure for controlling the change of flow paths.

A fifth aspect of the present disclosure is to help the user easily replace and wash a filter and prevent filter failures.

A sixth aspect of the present disclosure is to allow for easy removal of a replaceable filter, but in a way that does not get in the way of the functional versatility of various flow paths.

A seventh aspect of the present disclosure is to provide an efficient structure that can function on air passing through various flow paths.

Technical Solution

In order to address the aforementioned aspects, a clothes treatment apparatus according to an exemplary embodiment of the present disclosure comprises: a cabinet forming a treatment space for storing clothes; a filter module having a filter portion for filtering out dust from air passing therethrough; air flow path having a plurality of preset flow paths for directing air to be discharged into the treatment space; a fan for moving the air in the air flow path; a single valve disposed on the air flow path, that changes the air flow path by rotating around a predetermined rotational axis; a valve actuating module for rotating the valve; and a control part for controlling the angle of rotation of the valve so as to select one of the plurality of flow paths.

The plurality of flow paths may comprise: at least one bypass flow path for directing the air to bypass the filter portion; and at least one filtering flow path for directing the air to pass through the filter portion.

The plurality of flow paths may comprise: at least one circulation flow path for directing air drawn in from inside the treatment space; and at least one ventilation flow path for directing air drawn in from an outer space of the cabinet.

The plurality of flow paths may comprise: a bypass circulation flow path for directing air drawn in from inside the treatment space to bypass the filter portion; a filtering circulation flow path for directing the air drawn in from inside the treatment space to pass through the filter portion; and a ventilation flow path for directing air drawn in from an outer space of the cabinet to pass through the filter portion.

The clothes treatment apparatus may further comprise a steam module for supplying steam into the treatment space. The filter portion may comprise a HEPA filter.

The air flow path may comprises: an inner inlet section through which the air in the treatment space is admitted; a filter bypass section in which the air bypasses the filter portion; and a filter pass-through section in which the air passes through the filter portion.

The valve may be disposed at a point where the inner inlet section, the filter pass-through section, and the filter bypass section branch off from one another.

The at least one bypass flow path may comprise a bypass circulation flow path which is selected when the valve connects the inner inlet section and the filter bypass section. The at least one filtering flow path may comprise a filtering circulation flow path which is selected when the valve connects the inner inlet section and the filter pass-through section.

When the bypass circulation flow path is selected, the valve may shut off the filter pass-through section from the inner inlet section and the filter bypass section, and, when the filtering circulation flow path is selected, the valve may shut off the filter bypass section from the inner inlet section and the filter pass-through section.

The at least one filtering flow path may further comprise a ventilation flow path for directing air drawn in from an outer space of the cabinet.

The air flow path may further comprise an outside air inlet section through which air is drawn in from the outer space of the cabinet. The ventilation flow path may be selected to connect the outside air inlet section and the filter pass-through section, shut off the filter pass-through section from the inner inlet section and the filter bypass section, and shut off the filter bypass section from the inner inlet section.

The valve may alter the connection and shut-off relationships among the inner inlet section, filter pass-through section, and filter bypass section depending on the angle of rotation.

The valve may be configured in such a way as to select one of a plurality of modes depending on the angle of rotation, the plurality of modes comprising: a first mode in which the inner inlet section and the filter bypass section are connected together; a second mode in which the inner inlet section and the filter pass-through section are connected together; and a third mode in which the filter pass-through section is shut off from the inner inlet section and the filter bypass section and the filter bypass section is shut off from the inner inlet section.

The filter module may be placed across the filtering flow path and the bypass flow path and have a hole constituting at least part of the filter bypass section.

The valve may comprise a shut-off portion that protrudes in a centrifugal direction from the rotational axis. The clothe treatment apparatus may comprise a shut-off corresponding portion that is formed in a position corresponding to the radius of rotation of the shut-off portion from the rotational axis. A first connecting port for connecting the configuration space and the inner inlet section, a second connecting port for connecting the configuration space and the filter pass-through section, and a third connecting port for connecting the configuration space and the filter bypass section may be provided.

The shut-off corresponding portion may comprise: a first shut-off corresponding portion located between the first connecting port and the second connecting port; a second shut-off corresponding portion located between the second connecting port and the third connecting port; and a third shut-off corresponding portion located between the third connecting port and the first connecting port.

The valve may be configured in such a way as to select one of a plurality of modes depending on the angle of rotation, the plurality of modes comprising: a first mode in which the shut-off portion makes contact with the first shut-off corresponding portion and the second shut-off corresponding portion but is separated from the third shut-off corresponding portion; a second mode in which the shut-off portion makes contact with the second shut-off corresponding portion and the third shut-off corresponding portion but is separated from the first shut-off corresponding portion; and a third mode in which the shut-off portion makes contact with the first shut-off corresponding portion, second shut-off corresponding portion, and third shut-off corresponding portion.

The valve may be configured in such a way as to select one of a plurality of modes depending on the angle of rotation, the plurality of modes comprising: a first mode in which the valve connects the first connecting port and the third connecting port and shuts off the second connecting port from the first and third connecting ports; a second mode in which the valve connects the first connecting port and the second connecting port and shuts off the third connecting port from the first and second connecting ports; and a third mode in which the valve shuts off all the connections among the first to third connecting ports.

The shut-off portion may be formed in such a way as to be opened at least at 180 degrees with respect to the rotational axis.

The valve may comprise: a first shut-off portion that protrudes in a certain centrifugal direction with respect to the rotational axis; a second shut-off portion that protrudes in the direction opposite to the certain centrifugal direction with respect to the rotational axis; and a third shut-off portion that protrudes in another centrifugal direction, within the range of an angle between the first shut-off portion and the second shut-off portion with respect to the rotational axis.

The valve may further comprise a guide rib that runs across the first shut-off portion, second shut-off portion, and third shut-off portion.

Advantageous Effects

The clothes treatment apparatus is advantageous in that it can implement more various and diverse functions by switching between flow paths.

Moreover, it is possible to minimize structural costs and make it easy to control the change of flow paths by a single motor, since one of the plurality of flow paths can be selected by means of a single valve.

Another advantage is that it can remove impurities from air supplied into the treatment space when necessary, taking into consideration the effect of air on the filter portion, by including the bypass flow path and the filtering flow path.

Also, fresh air can be supplied to clothes by including a ventilation flow path. A further advantage is that the effect on the air around the clothes treatment apparatus can be taken into consideration since the ventilation flow path can be selected.

By including the filtering flow path and the bypass flow path, in addition to the steam module and the HEPA filter, the high-performance functions of the HEPA filter can be employed, and steam can be guided not to pass through the HEPA when supplied into the treatment space through the steam module.

The connection and shut-off relationships between the different sections can be easily controlled since the valve is located at the branch-off point.

By forming a hole in the filter module that constitutes at least part of the filter bypass section, the filter module can be easily pushed into or pulled out from the cabinet, without getting in the way of the formation of the filter bypass section.

By including the shut-off portion and the shut-off corresponding portion, the connection and shut-off relationships between the different sections can be easily controlled only by adjusting the angle of rotation of the valve.

By forming the shut-off portion in such a way as to be opened at least at 180 degrees with respect to the rotational axis, the shut-off portion provides a function of shutting off the different sections from one another, and minimizes any interference with smooth air flow between the difference sections. Also, the shut-off portion's resistance to air flowing along the surface of the shut-off portion may be reduced.

By including the first to third shut-off portions, it is possible to provide a minimal structure for allowing the shut-off portion to shut the difference sections off from one another, thereby reducing material costs.

By including the stopper, it is easy to adjust the angle of rotation of the valve by the step rotation of the motor.

BRIEF DESCRIPTION OF DRAWINGS

FIG. 7A shows that the bypass circulation flow path Pa is selected; FIG. 7B shows that the filtering circulation flow path Pb is selected; and FIG. 7C shows that the ventilation flow path Pc is selected.

DETAILED DESCRIPTION

Figure 1:
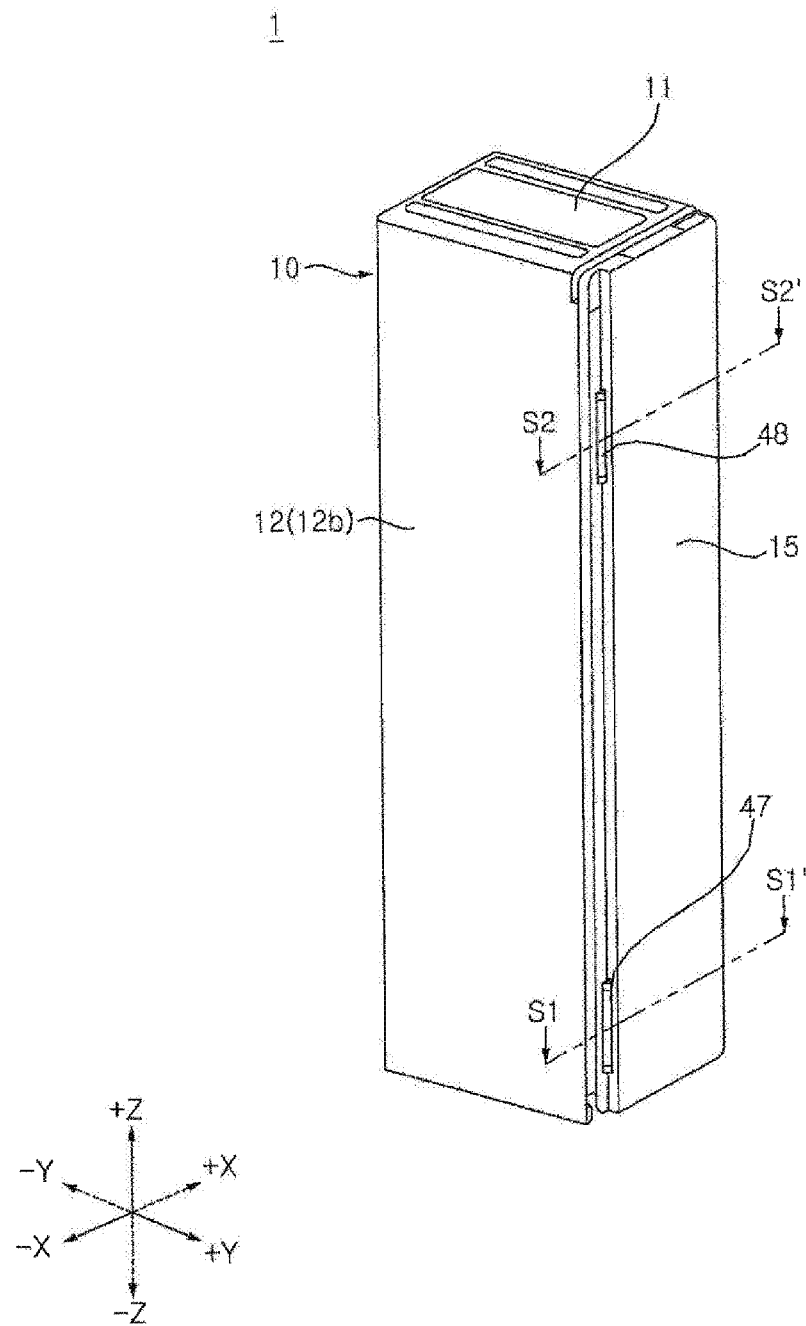
FIG. 1 is a perspective view of a clothes treatment apparatus 1 according to an exemplary embodiment of the present disclosure.

To explain the present disclosure, a description will be made below with respect to a spatial orthogonal coordinate system where X, Y, and Z axes are orthogonal to each other. Each axis direction (X-axis direction, Y-axis direction, and Z-axis direction) refers to two directions in which each axis runs. Each axis direction with a '+' sign in front of it (+X-axis direction, +Y-axis direction, and +Z-axis direction) refers to a positive direction which is one of the two directions in which each axis runs. Each axis direction with a '−' sign in front of it (−X-axis direction, −Y-axis direction, and −Z-axis direction) refers to a negative direction which is the other of the two directions in which each axis runs.

The terms mentioned below to indicate directions such as "front(+Y)/back(−Y)/left(+X)/right(−X)/up(+Z)/down(−Z)" are defined by the X, Y, and Z coordinate axes, but they are merely used for a clear understanding of the present disclosure, and it is obvious that the directions may be defined differently depending on where the reference is placed.

The terms "upstream" and "downstream" mentioned in the description below are defined with respect to the direction of a preset air flow.

The terms with ordinal numbers such as "first", "second", "third", etc. added to the front are used to describe constituent elements mentioned below, are intended only to avoid confusion of the constituent elements, and are unrelated to the order, importance, or relationship between the constituent elements. For example, an embodiment including only a second component but lacking a first component is also feasible.

The singular forms used herein are intended to include plural forms as well, unless the context clearly indicates otherwise.

A clothes treatment apparatus 1 according to an exemplary embodiment of the present disclosure comprises a cabinet 10 placed on a floor on the outside or fixed to a wall on the outside. The cabinet 10 forms a treatment space 10s for storing clothes. The clothes treatment apparatus 1 may comprise a hanger module 30 provided to hang clothes or clothes hangers. The clothes treatment apparatus 1 has an air flow path P for supplying air to clothes. The clothes treatment apparatus 1 comprises a fan 50 for moving the air in the air flow path P. The clothes treatment apparatus 1 may comprise a heat exchange module 60 for heating or cooling air passing through it. The clothes treatment apparatus 1 comprises a valve 70 disposed on the air flow path P. The clothes treatment apparatus 1 comprises a valve actuating module 80 for actuating the valve 70.

The clothes treatment apparatus 1 may comprise a filter module 90 having a filter portion 95 for filtering out dust from air passing therethrough. The clothes treatment apparatus 1 may further comprise an auxiliary filter (not shown) having a different function from the filter module 90.

The clothes treatment apparatus 1 comprises a control part 2 for controlling various components. The control part 2 allows to select one of the plurality of flow paths.

Figure 2:
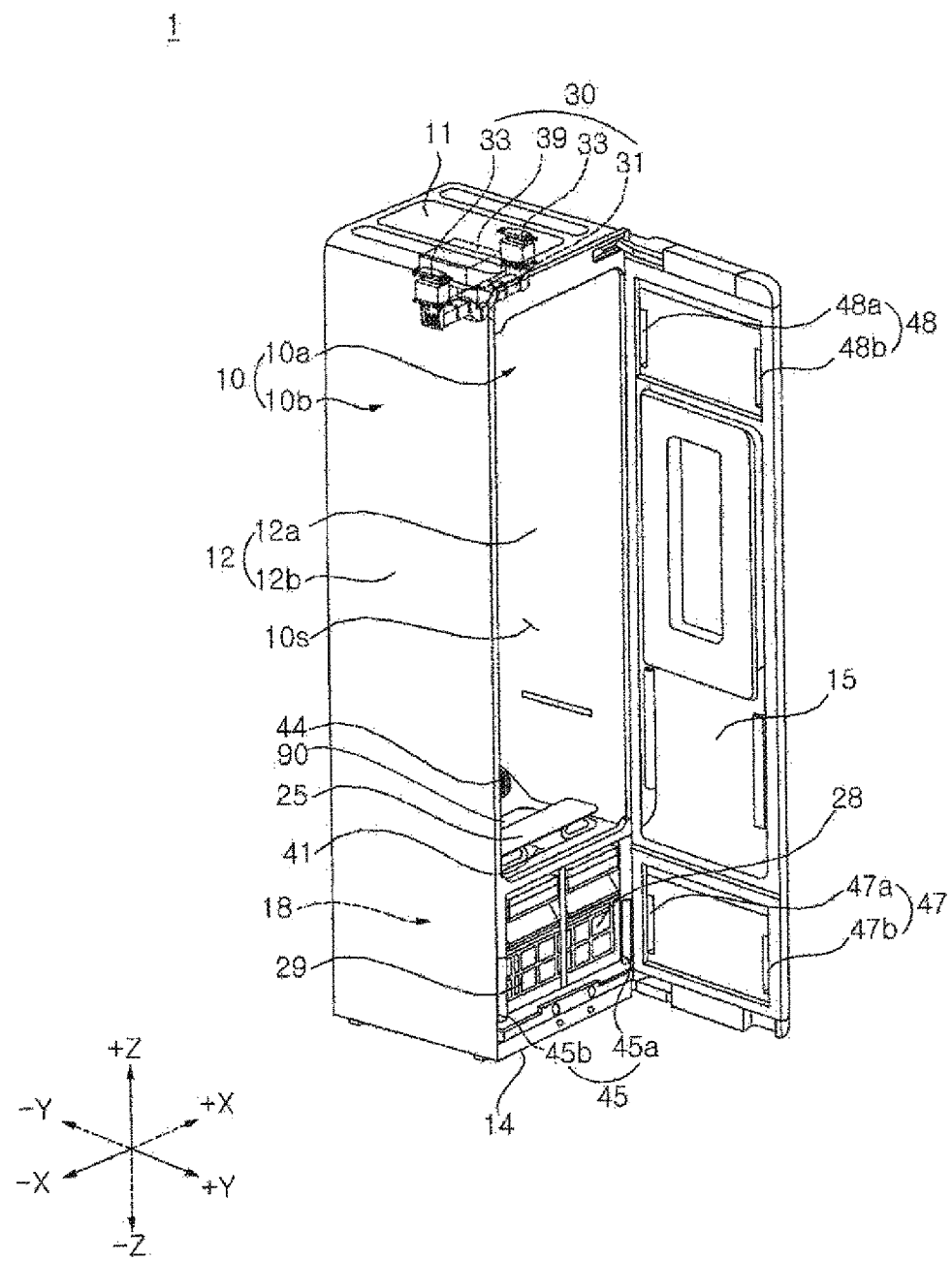
FIG. 2 is a perspective view of the clothes treatment apparatus 1 of FIG. 1 when the door 15 is open.
Figure 3:
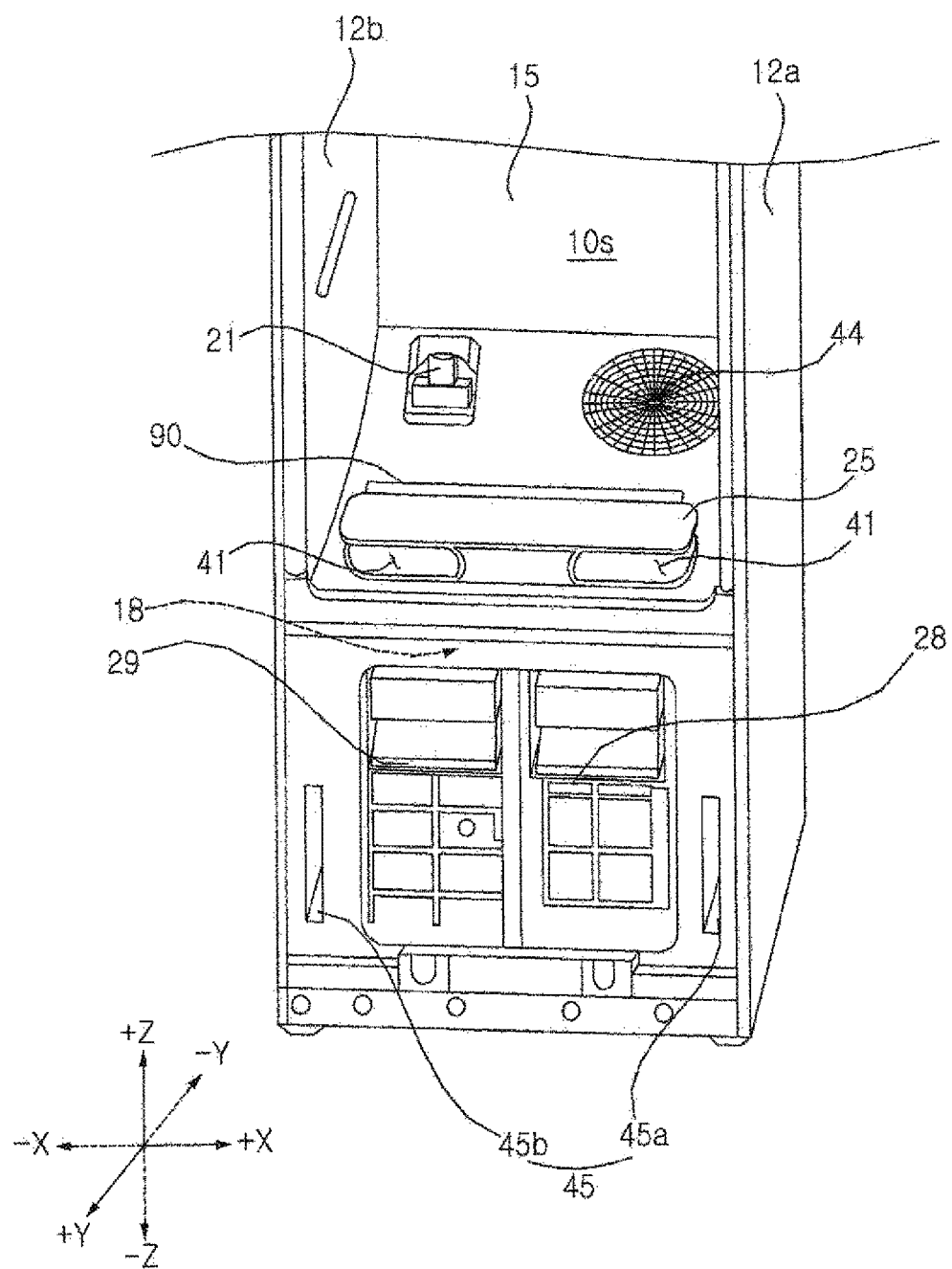
FIG. 3 is a partial perspective view showing part of the treatment space 10s of the clothes treatment apparatus 1 of FIG. 2.

Referring to FIGS. 1 to 3, the cabinet 10 forms the external appearance. The cabinet 10 comprises a top panel 11 forming the top side, side panels 12 forming the left and right sides, and a rear panel 13 forming the rear side. The cabinet 10 comprises a base 14 forming the bottom side. The side panels 12 may comprise a first side panel 12a forming the left side and a second side panel 12b forming the right side.

The cabinet 10 comprises an interior cabinet 10a forming the inner side. The cabinet 10 comprises an exterior cabinet 10b forming the outer side.

The cabinet 10 comprises a door 15 for putting clothes in the treatment space 10s. The door 15 may open or close an open side of the treatment space 10s. The door 15 may open or close the treatment space 10s as it swings on a predetermined rotational axis that extends vertically. When the door 15 closes, the treatment space 10s is separated from the outside, and when the door 15 opens, the treatment space 10s is exposed to the outside. The door 15, in a closed state, may cover an external air connector 45 to be described later. The door 15, in a closed state, may cover a condensate storage portion 28 and a feed-water storage portion 29.

The interior cabinet 10a and the inner side of the door 15 define the treatment space 10s. The treatment space 10s is a space in which air (for example, hot air), steam, a deodorizer, and/or an anti-static agent is applied to clothes so as to change physical or chemical properties of the clothes. Clothes treatment may be done on the clothes in the treatment space 10s by various methods.

For example, hot air may be applied to the clothes in the treatment space 10s to dry the clothes. Also, steam may be provided to the clothes in the treatment space 10s to remove wrinkles on the clothes. The air and/or steam provided into the treatment space 10s affects the physical or chemical properties of the clothes. The tissue structure of the clothes is relaxed by hot air or steam, so that the wrinkles are smoothed out, and an unpleasant odor is removed as odor molecules trapped in the clothes react with steam. In addition, the hot air and/or steam may sterilize bacteria present in the clothes.

For example, dust may be removed from the clothes in the treatment space 10s by air circulation or filtering. Moreover, air from outside the cabinet 10 may be supplied to the clothes so as to dehumidify the clothes in the treatment space 10s or to remove smells from the clothes. In addition, a deodorizer may be sprayed to the clothes in the treatment space 10s to add fragrance to the clothes, or an anti-static agent may be sprayed to the clothes to prevent static cling on them.

The cabinet 10 has a machine room 18 for treating the air provided into the treatment space 10s. The machine room 18 may be disposed under the treatment space 10s. A flow path body 26, the fan 50, and the heat exchange module 60 may be disposed within the machine room 18. The valve 70 and the valve actuating module 80 may be disposed within the machine room 18.

The filter module 90 may be disposed within the machine room 18. The filter module 90 may be disposed in such a way as to be pulled out from inside the machine room 18. A cover 25 may be disposed which forms a gap with the bottom side of the treatment space 10s to form an inner intake opening 41 and covers the inner intake opening 41 when viewed from above. Also, the auxiliary filter may be removably placed under the cover 25.

Referring to FIG. 2, the hanger module 30 may be disposed above the treatment space 10s. The hanger module 30 is supported by the cabinet 10. The hanger module 30 may be movable.

The hanger module 30 comprises a hanger body 31 provided to hang clothes or clothes hangers. In an example, the hanger body 31 may be formed with locking grooves (not shown) for hanging clothes hangers. In another example, the hanger body 31 may be formed with hooks (not shown) or the like so that clothes are hung directly on them.

The hanger body 31 may be connected to the cabinet 10 through a hanger moving portion 33. The hanger body 31 may vibrate in a predetermined vibration direction (+X, −X). The hanger body 31 may extend longitudinally in the vibration direction (+X, −X). A plurality of locking grooves (not shown) may be disposed on the upper side of the hanger body 31, spaced apart from each other, in the vibration direction (+X, −X). The locking grooves may extend in a direction (+Y, −Y) intersecting the vibration direction (+X, −X).

The hanger module 30 may comprise a hanger moving portion 33 which movably supports the hanger body 31. The hanger moving portion 33 is movable in the vibration direction (+X, −X). The hanger moving portion 33 may be made of a flexible material so as to make the hanger body 31 move. The hanger moving portion 33 may comprise an elastic member that is elastically deformable when the hanger body 31 moves. The upper edge of the hanger moving portion 33 is fixed to the cabinet 10, and the lower edge is fixed to the hanger body 31. The hanger moving portion 33 may extend vertically.

The hanger module 30 may comprise a vibration unit 39 for generating vibration. The vibration unit 39 is connected to the hanger body 31 to transmit vibrations from the vibration unit 39 to the hanger body 31. The vibration unit 39 may be disposed over the hanger body 31. For example, the hanger body 31 may be formed with a slit (not shown) extending in a direction (+Y, −Y) orthogonal to the vibration direction (+X, −X), and the vibration unit 39 may comprise a protruding portion (not shown) that protrudes downward and is inserted into the slit. The protruding portion of the vibration unit 39, while inserted in the slit of the hanger body 31, moves relative to the slit in the orthogonal direction (+Y, −Y), thereby transmitting excitation force to the hanger body 31 only in the vibration direction (+X, −X).

Figure 7A:
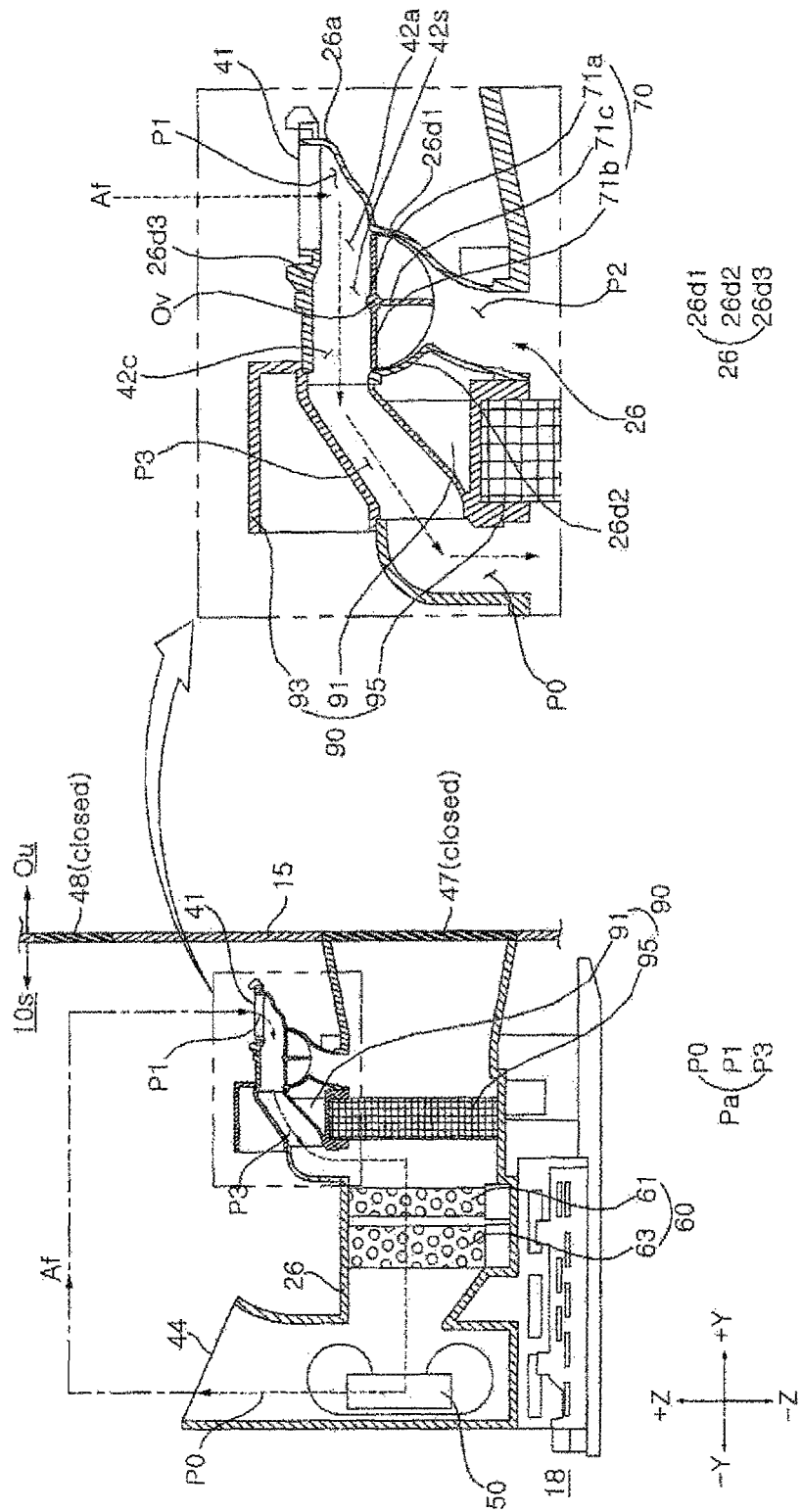
FIGS. 7A to 7C are views showing the working mechanism of the valve 70 disposed on the flow path body 26 within the machine room of the clothes treatment apparatus 1 of FIG. 1, each illustrating a vertical cross-sectional conceptual diagram of the flow path body 26 and door 15 on the left side and an enlarged cross-sectional view of the current state of the valve 70 on the right side.
Figure 7B:
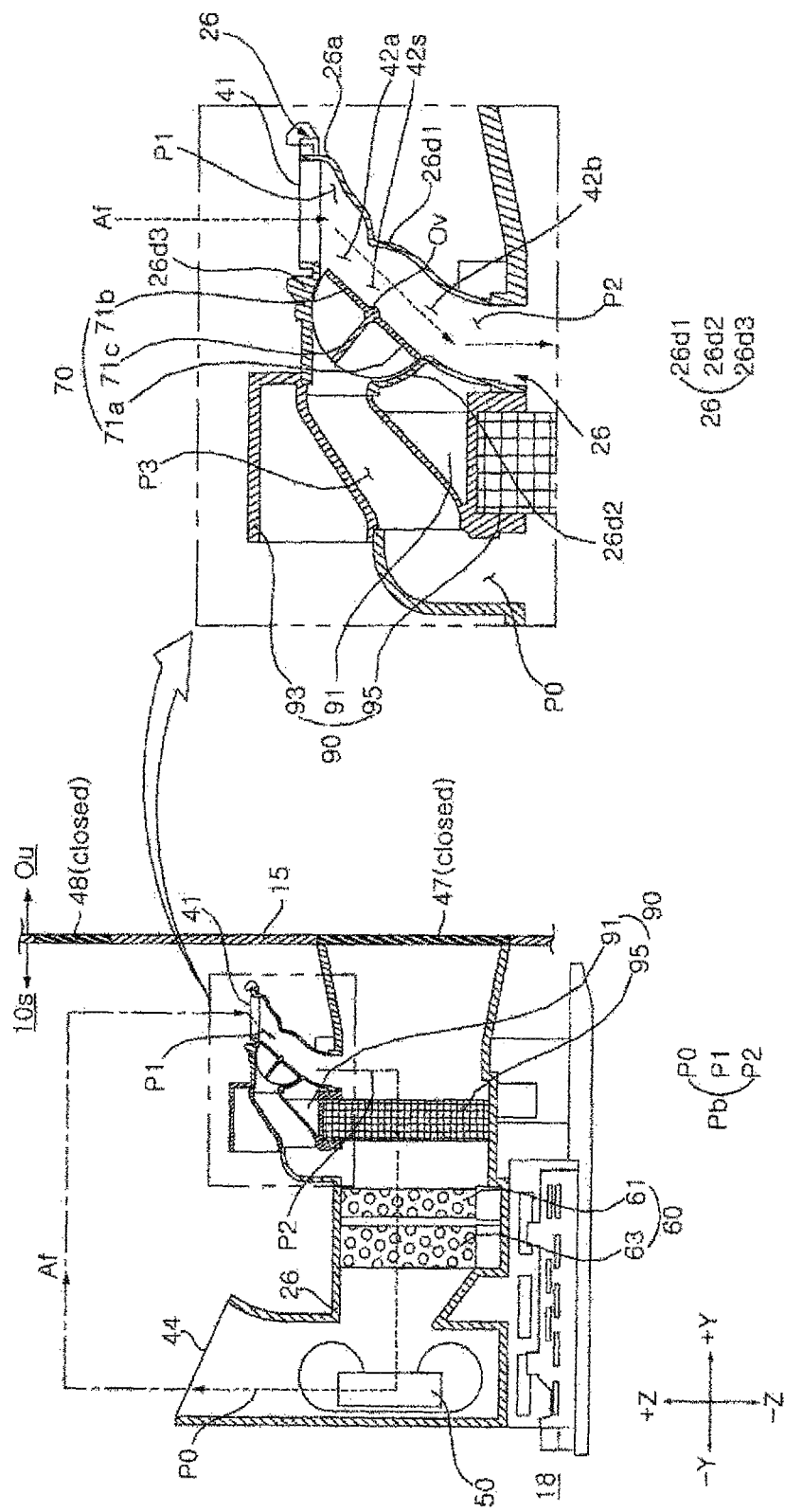
Figure 7C:
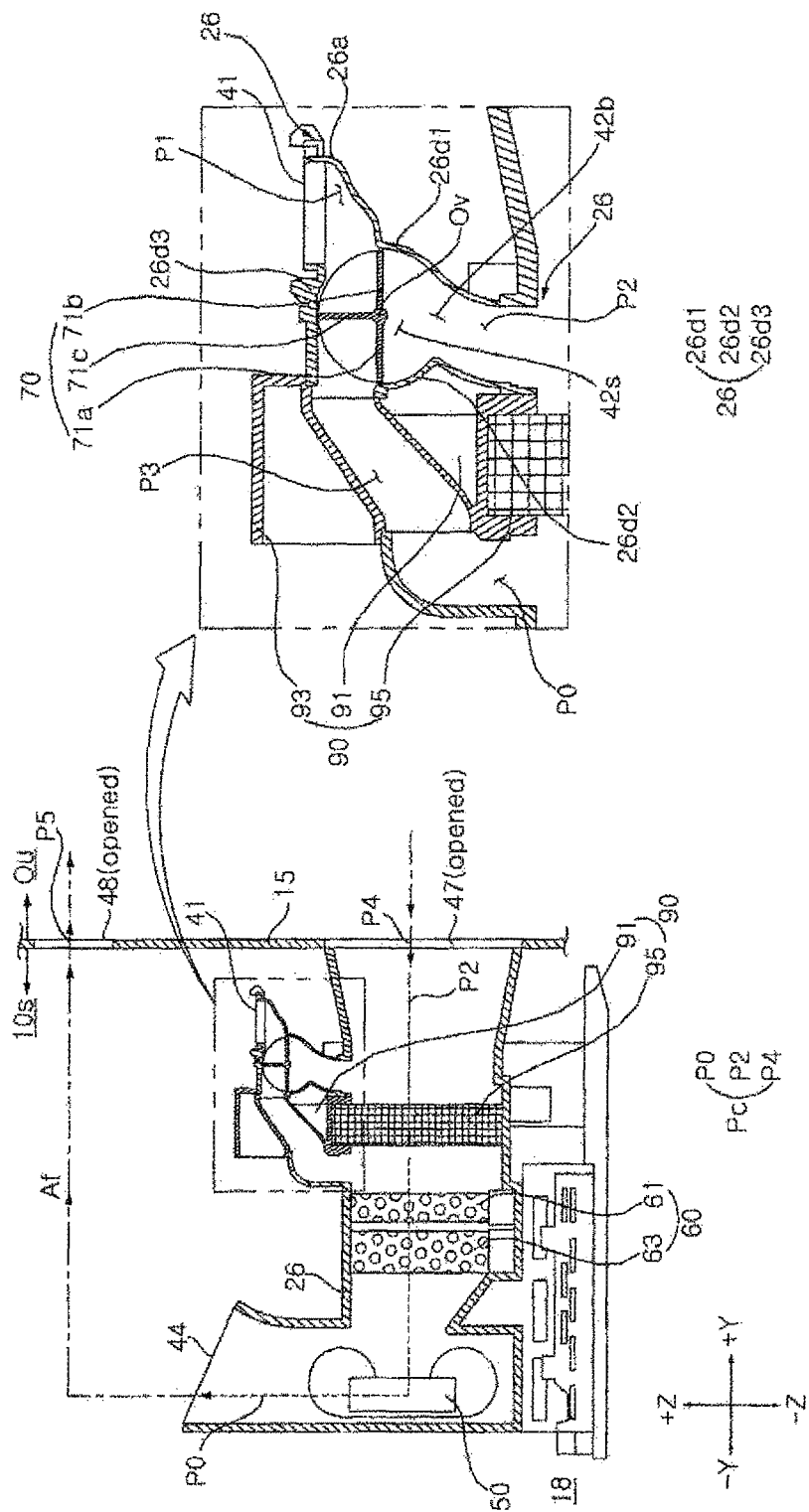

Referring to FIGS. 7A to 7C, an air flow path P directs air to be discharged into the treatment space 10s. The air flow path P has a plurality of preset flow paths for directing air to be discharged into the treatment space 10s. One of the plurality of preset flow paths may be selected by the valve 70. The clothes treatment apparatus 1 comprises a flow path body 26 that marks off the air flow path P. The flow path body 26 may be disposed within the machine room 18.

Referring to FIGS. 1 to 4, an inner intake opening 41 is provided to draw in air from inside the treatment space 10s. The inner intake opening 41 is disposed on the interior cabinet 10a. The inner intake opening 41 may be disposed at the bottom side of the interior cabinet 10a. The inner intake opening 41 may be located between the cover 25 and the interior cabinet 10a. The air in the treatment space 10s may be admitted into the air flow path P through the inner intake opening 41.

An inner discharge opening 44 is provided to discharge air into the treatment space 10s. The inner discharge opening 44 is disposed on the interior cabinet 10a. The inner discharge opening 44 may be disposed at the bottom side of the interior cabinet 10a. The inner discharge opening 44 may have a radial web structure. The air in the air flow path P may be discharged into the treatment space 10s through the inner discharge opening 44.

While circulation flow paths Pa and Pb to be described later are selected, the air drawn into the air flow path P from the treatment space 10s through the inner intake opening 41 is discharged to the treatment space 10s through the inner discharge opening 44 after going through a certain treatment. In this exemplary embodiment, the inner intake opening 41 and the inner discharge opening 44 are disposed respectively at the front and rear of the bottom of the treatment space 10s.

An outside air inlet section P4 may be provided to draw in air from an outer space Ou of the cabinet 10. The air in the outer space Ou may be admitted into the air flow path P through the outside air inlet section P4. The outside air inlet section P4 may be formed in the shape of a hole. The outside air inlet section P4 may be disposed on the door 15. The outside air inlet section P4 constitutes an upstream end of a ventilation flow path Pc to be described later. The outside air inlet section P4 may be configured to open and close.

While the ventilation flow path Pc to be described later is selected, air drawn into the air flow path P from the outer space Ou through the outside air inlet section P4 may be discharged to the treatment space 10s through the inner discharge opening 44 after going through a certain treatment.

An exhaust air outlet section P5 may be provided to discharge air to the outer space Ou of the cabinet 10. The air in the treatment space 10s may be discharged to the outer space Ou through the exhaust air outlet section P5. The exhaust air outlet section P5 may be formed in the shape of a hole. The exhaust air outlet section P5 may be disposed at the door 15. The exhaust air outlet section P5 may be disposed between the treatment space 10s and the outer space Ou. The exhaust air outlet section P5 constitutes a flow path connecting the treatment space 10 and the outer space Ou. The exhaust air outlet section P5 may be configured to open and close.

While the door 15 is closed, air that has passed through the outside air inlet section P4 is admitted into the machine room 15 through an outside air connecting port 45. The outside air connecting port 45 may open toward the backside of the door 15. The outside air connecting part 45 is formed in a position corresponding to a downstream end of the outside air connecting port 45 while the door 15 is closed. After sequentially passing through the outside air inlet section P4 and the outside air connecting port 45, the air is admitted into the flow path body 26. Specifically, the air that has passed through the outside air connecting port 45 may be admitted into a filter pass-through section P2.

The outside air connecting port 45 is disposed under the treatment space 10s. The door 15 covers the outside air connecting port 45 while the door 15 is closed. The outside air connecting port 45 may be formed on a side of the machine room 18 facing the door 15. The outside air connecting port 45 may be disposed at the front of the machine room 18. The outside air connecting port 45 may be exposed while the door 15 is open.

A first outside air connecting port 45a and a second outside air connecting port 45b may be provided corresponding to a first outer intake portion 47A and second outer intake portion 47B disposed on the door 15. The first outside air connecting port 45a and the second outside air connecting port 45b may be disposed symmetrically on the left and right. The first outside air connecting port 45a and the second outside air connecting port 45b may be disposed with the condensate storage portion 28 and feed-water storage portion 29 in between.

The clothes treatment apparatus 1 may comprise an outer intake portion 47 forming the outside air inlet section P4. The outer intake portion 47 may be disposed on the door 15. The outer intake portion 47 may open or close the outside air inlet section P4. The outer intake portion 47 may open or close the outside air inlet section P4 by rotating relative to the door 15 in a predetermined rotation direction M1. The outer intake portion 47 may be rotatable relative to the door 15 on a predetermined rotational axis that extends vertically. A driving portion (not shown) for actuating the outer intake portion 47 may be disposed inside the door 15.

A plurality of outer intake portions 47A and 47B may be provided. In this exemplary embodiment, the first outer intake portion 47A and the second outer intake portion 47B are disposed on two opposite sides of the door 15. The plurality of outer intake portions 47A and 47B may be configured to open or close simultaneously.

Figure 4A:
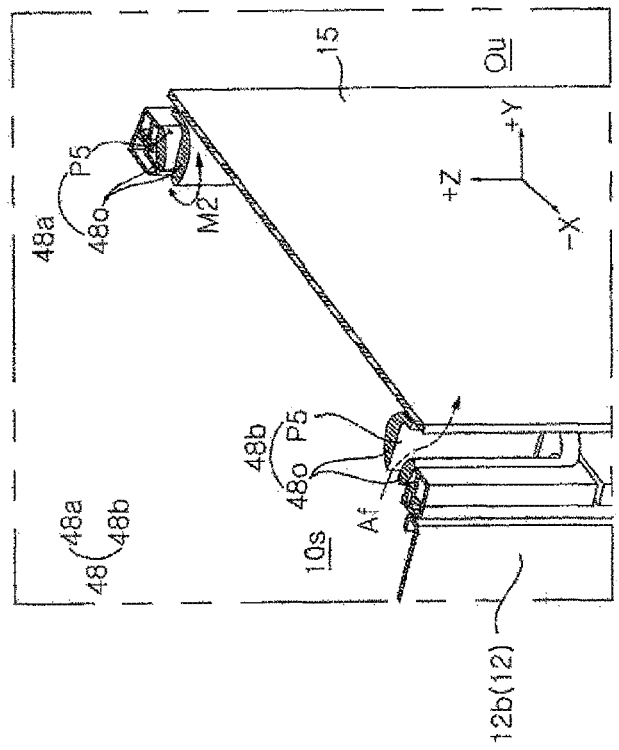
FIG. 4A is a horizontal cross-sectional perspective view of the clothes treatment apparatus 1 of FIG. 1, taken along the line S1-S1'.

Referring to FIG. 4A, the outer intake portion 47 may comprise an open-close portion 47o defining the outside air inlet section P4. The outside air inlet section P4 is formed through the open-closed portion 47o. The open-close portion 47o is rotatable relative to the door 15. An intake hole corresponding to the outside air inlet section P4 may be formed on the outer side of the door 15. Referring to the arrow Af in (a) of FIG. 4, when the open-close portion 47o rotates and therefore an upstream end of the outside air inlet section P4 matches the intake hole of the door 15, the air in the outer space Ou may be admitted into the machine room 18 through the outside air inlet section P4.

The clothes treatment apparatus 1 may comprise an outer discharge portion 48 forming the exhaust air outlet section P5. The outer discharge portion 48 may be disposed on the door 15. The outer discharge portion 48 may open or close the exhaust air outlet section P5. The outer discharge portion 48 may open or close the exhaust air outlet section P5 by rotating relative to the door 15 in a predetermined rotation direction M2. The outer discharge portion 48 may be rotatable relative to the door 15 on a predetermined rotational axis that extends vertically. A driving portion (not shown) for actuating the outer discharge portion 48 may be disposed inside the door 15.

A plurality of outer discharge portions 48a and 48b may be provided. In this exemplary embodiment, the first outer discharge portion 48a and the second outer discharge portion 48b are disposed on two opposite sides of the door 15. The plurality of outer discharge portions 48a and 48b may be configured to open or close simultaneously.

The outer discharge portion 48 is disposed above the outer intake portion 47. The outer discharge portion 48 and the outer intake portion 47 may be configured to open and close simultaneously.

Figure 4B:
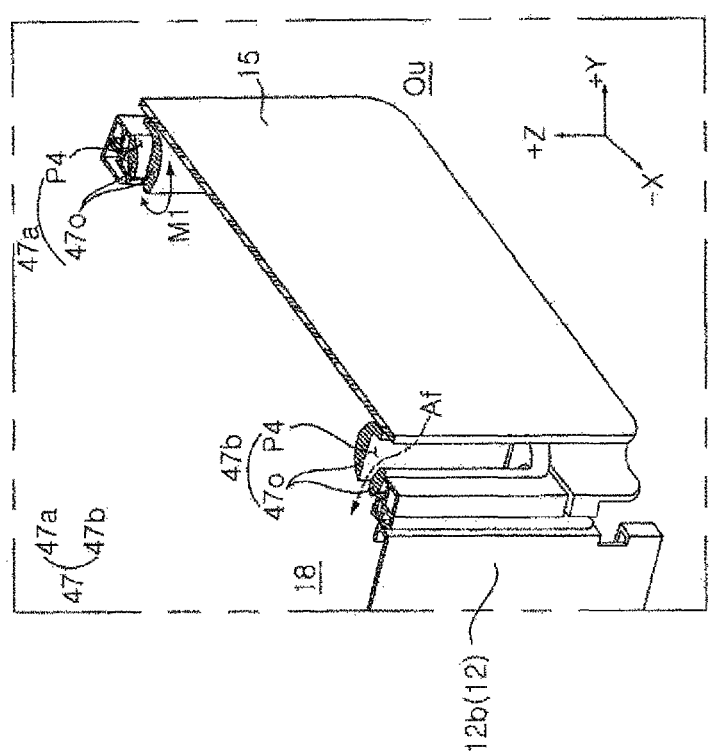
FIG. 4B is a horizontal cross-sectional perspective view of the clothes treatment apparatus 1 of FIG. 1, taken along the line S2-S2'.

Referring to FIG. 4B, the outer discharge portion 48 may comprise an open-close portion 48o defining the exhaust air outlet section P5. The exhaust air outlet section P5 is formed through the open-close portion 48o. The open-close portion 48o is rotatable relative to the door 15. A discharge hole may be formed on the outer side of the door 15. Referring to the arrow Af in (b) of FIG. 4, when the open-close portion 48o rotates and therefore a downstream end of the exhaust air inlet section P5 matches the discharge hole of the door 15, the air in the treatment space 10s may be discharged to the outer space Ou through the exhaust air outlet section P5.

Referring to FIGS. 7A to 7C, the fan 50 exerts pressure on the air in the air flow path P. The fan 50 is disposed on the air flow path P. The fan 50 is disposed within the flow path body 26. The fan 50 is disposed in a shared section P0 to be described later. Through this, whichever one of the plurality of flow paths is selected may direct the flow of air in the air flow path P to the single fan 50.

The fan 50 may be disposed at the rear of the flow path body 26. The fan 50 may be located closer to the inner discharge opening 44 than to the inner intake opening 41. The shared section P0 forms a flow path directing the flow of air from the front to the rear and then forms a flow path directing the flow of air to the inner discharge opening 44 as it is bent upward. The fan 50 may be disposed at a point where the shared section is bent upward. The fan 50 may be implemented as a centrifugal fan.

Referring to FIGS. 7A to 7C, the heat exchange module 60 is disposed on the air flow path P. The heat exchange module 60 is disposed within the flow path body 26. The heat exchange module 60 is disposed in the shared section P0 to be described later. Through this, whichever one of the plurality of flow paths is selected may treat the air in the air flow path P by means of the single heat exchange module 60.

The heat exchange module 60 may heat the air in the air flow path P. Specifically, the heat exchange module may comprise a first heat exchanger 61 functioning as an evaporator and a second heat exchanger 63 functioning as a condenser. The heat exchange module 60 may comprise a compressor (not shown) and an expansion valve (not shown). The heat exchange module 60 may have a refrigerant cycle in which refrigerant sequentially travels through the compressor, the condenser, the expansion valve, and the evaporator. As the air in the air flow path P passes through the first heat exchanger 61 first, the moisture in the air is condensed, and the air passes through the second heat exchanger 63, it is heated because its heat capacity has decreased due to the generation of condensate. Thus, the air has a lower humidity and higher temperature after it has passed through the second heat exchanger 63, as compared to before the air passes through the first heat exchanger 61.

Although not shown, in another exemplary embodiment, the heat exchange module 60 may comprise a cooling device for making treated air cooler than before the treatment.

The operation of the heat exchange module 60 may be controlled by the control part 2. By operating the fan 50 while the heat exchange module 60 is not operating, air not treated with heat while flowing through the air flow path P may be supplied into the treatment space 10s.

Referring to FIGS. 2 and 3, the clothes treatment apparatus 1 may comprise a condensate storage portion 28 for storing condensate generated in the heat exchange module 60. Condensate generated in the first heat exchanger 61 of the heat exchange module 60 may be collected into the condensate storage portion 28. The condensate storage portion 28 may be pulled out. The condensate storage portion 28 may be pulled forward while the door 15 is open.

The clothes treatment apparatus 1 may comprise a steam module 7 for supplying steam into the treatment space 10s. The steam module 7 may comprise a steam generator (not shown) for generating steam and a steam spout 21 for discharging generated steam into the treatment space 10s. The steam generator may be disposed within the machine room 18. The steam spout 21 is disposed in the interior cabinet 10a. In this exemplary embodiment, the steam spout 21 is disposed at the rear of the bottom side of the treatment space 10s.

The clothes treatment apparatus 1 may comprise a feed-water storage portion 29 for storing water to be supplied to the steam module 7. The water in the feed-water storage portion 29 may be moved to the steam generator and changed into steam. The feed-water storage portion 29 may be pulled out. The feed-water storage portion 29 may be pulled forward while the door 15 is open.

Figure 5:
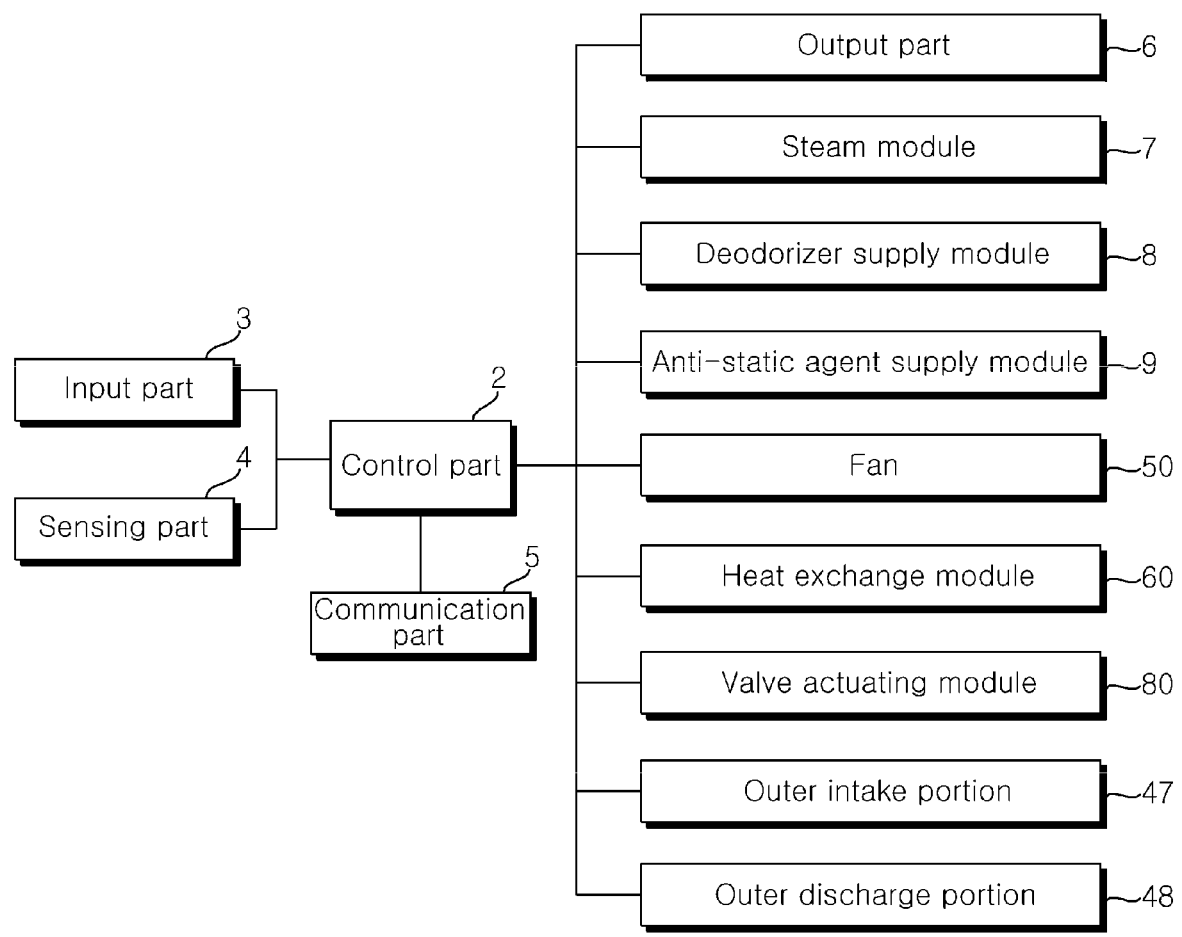
FIG. 5 is a control block diagram of the clothes treatment apparatus 1 of FIG. 1.

Referring to FIG. 5, the clothes treatment apparatus 1 may comprise an input part 3 for receiving On/Off and other various commands. The input part 3 may comprise a key, a button, a dial, and/or a touchscreen.

The clothes treatment apparatus 1 may comprise a sensing part 4 for sensing environment information for clothes treatment. The environment information may include information about clothes contained in the treatment space 10s. The environment information may include information about the state of air in the treatment space 10s. The environment information may include information about the state of air in the air flow path P. The environment information may include information about the state of air in the outer space Ou.

The air state information may comprise temperature information. The air state information may comprise humidity information. The air state information may comprise air pollution information.

For example, the sensing part 4 may comprise a clothes recognition sensor (not shown) for sensing clothes contained inside the treatment space 10s. The sensing part 4 may comprise a humidity sensor (not shown) for sensing air humidity. The sensing part 4 may comprise a temperature sensor (not shown) for sensing air temperature. The humidity sensor and the temperature sensor may be implemented as a temperature and humidity sensor which senses both humidity and temperature at the same time.

The clothes treatment apparatus 1 may comprise a communication part 5 provided to communicate with an external server, terminal, and/or charging stand.

The clothes treatment apparatus 1 may comprise an output part 6 for delivering various information to the user. The output part 6 may comprise a speaker and/or a display.

The clothes treatment apparatus 1 may further comprise a deodorizer supply module 8 for supplying a deodorizer into the treatment space 10s. The clothes treatment apparatus 1 may further comprise an anti-static agent supply module 9 for supplying an anti-static agent into the treatment space 10s.

The control part 2 may receive information from the input part 3 and process it. The control part 2 may receive or send information through the communication part 5. The control part 2 may control various components 6, 7, 8, 9, 50, 60, 80, 47, and 48 based on information received through the input part 3 or communication part 5.

The control part 2 may receive sensed environment information from the sensing part 4 and process it. The control part 2 may control various components 6, 7, 8, 9, 30, 50, 60, 80, 47, and 48 based on the environment information sensed by the sensing part 4. For example, the control part 2 may control the clothes treatment apparatus 1 to select a ventilation mode to be described later, based on environment information that the humidity of the air in the outer space Ou is lower than the humidity of the air in the treatment space 10s.

The control part 2 may control the output of the output part 6. The control part 2 may control the operation of the steam module 7. The control part 2 may control the operation of the deodorizer supply module 8. The control part 2 may control the operation of the anti-static agent supply module 9. The control part 2 may control the operation of the fan 50. The control part 2 may control the operation of the heat exchange module 60. The control part 2 may control the vibration of the hanger module 30.

The control part 2 may control the operation of the valve actuating module 80. The control part 2 may control the valve actuating module 80 so as to select one of the plurality of flow paths (see FIGS. 7A to 7C). The control part 2 may operate the valve actuating module 80 to change from one of the plurality of flow paths to another.

When the valve 70 is actuated by the valve actuating module 80, the "selected flow path" among the plurality of flow paths is changed. The selected flow path as used herein refers to one of the plurality of flow paths selected in the current mode. For example, the selected flow path in FIG. 7A is a bypass circulation flow path, the selected flow path in FIG. 7B is a filtering circulation flow path, and the selected path in FIG. 7C is a ventilation flow path.

As a single valve 70 rotates around a predetermined rotational axis Ov, it changes the air flow path. The valve actuating module 80 rotates the valve. The control part 2 controls the angle of rotation of the valve 70 so as to select one of the plurality of flow paths. The "angle of rotation" as used herein refers to the angle at which the valve 70 rotates relative to a reference position. For example, when the position of the valve 70 in FIG. 7A as viewed from the right (−X) is seen as the reference position, the angle of rotation of the valve 70 in FIG. 7A is 0 degrees, the angle of rotation of the valve 70 in FIG. 7B is about 120 degrees, and the angle of rotation of the valve 70 in FIG. 7C is about 180 degrees.

The control part 2 may control the operation of the outer intake portion 47 and outer discharge portion 48. The control part 2 may control the outer intake portion 47 and outer discharge portion 48 so as to select one of the plurality of flow paths (see FIGS. 7A to 7C).

Hereinafter, referring to FIGS. 7A to 7C, the air flow path P having a plurality of preset flow paths will be described in detail below. FIGS. 7A to 7C show the arrows pointing the direction Af of air flow, and the type of the arrows vary for different sections of the air flow path P.

Air may be supplied into the treatment space 10s through the air flow path P. The air in the treatment space 10s may be circulated and supplied through the air flow path P. The air in the treatment space 10s may be drawn in from inside the treatment space 10s and discharged into the treatment space 10s, through the air flow path P. The air in the outer space Ou may be supplied into the treatment space 10s through the air flow path P.

The air moving through the air flow path P may be supplied into the treatment space 10s after going through a predetermined treatment space. For example, air heated by the heat exchange module 60 may be supplied into the treatment space 10s. Air dehumidified by the heat exchange module 60 may be supplied into the treatment space 10s. Air cooled by the heat exchange module 60 may be supplied into the treatment space 10s. Also, untreated air may be supplied into the treatment space 10s. Air with a deodorizer or anti-static agent added to it may be supplied into the treatment space 10s through the air flow path P.

One of the plurality of flow paths is preset to be selected. In this exemplary embodiment, although FIGS. 7A, 7B, and 7C illustrate that one of the plurality of flow paths Pa, Pb, and Pc is selected, the number of selected flow paths is not limited but two flow paths or four or more flow paths may be selected. By means of the valve 70, the selected flow path may be switched from one of the plurality of flow paths to another.

The plurality of flow paths may be distinguished depending on whether air passes through the filter portion 95 or not. Referring to FIG. 7A, the plurality of flow paths may comprise at least one bypass flow path Pa for directing the air to bypass the filter portion 95. Referring to FIG. 7B and FIG. 7C, the plurality of flow paths may comprise at least one filtering flow path Pb and Pc for directing the air to pass through the filter portion 95. Here, whether or not the air passes through the filter portion 95 is defined with respect to a certain filter portion 95, but not with respect to another filter portion (e.g., the auxiliary filter) through which the air passes. That is, the air bypassing the filter portion 95 does not mean to exclude that the air may pass through the auxiliary filter.

The at least one bypass flow path Pa may comprise a bypass circulation flow path Pa for directing the air drawn in from inside the treatment space 10s. The at least one filtering flow path Pb and Pc may comprise a filtering circulation flow path Pb for directing the air drawn in from inside the treatment space 10s. The at least one filtering flow path Pb and Pc may comprise a ventilation flow path Pc for directing air drawn in from the outer space Ou.

The plurality of flow paths may be distinguished depending on whether air circulates in the treatment space 10s or not. Referring to FIG. 7A and FIG. 7B, the plurality of flow paths may comprise at least one circulation flow path Pa and Pb for directing the air drawn in from inside the treatment space 10s. Referring to FIG. 7C, the plurality of flow paths may comprise at least one ventilation flow path Pc for directing the air drawn in from the outer space Ou of the cabinet 10.

The at least one circulation flow path Pa and Pb may comprise a bypass circulation flow path Pa for directing air to bypass the filter portion 95. The at least one circulation flow path Pa and Pb may comprise a filtering circulation flow path Pb for directing air to pass through the filter portion 95. The ventilation flow path Pc may be provided to direct air to pass through the filter portion 95.

In this exemplary embodiment, the bypass circulation flow path Pa directs the air drawn in from inside the treatment space 10s so that it bypasses the filter portion 95. In this exemplary embodiment, the filtering circulation flow path Pb directs the air drawn in from inside the treatment space 10s so that it passes through the filter portion 95. In this exemplary embodiment, the ventilation flow path Pc directs the air drawn in from the outer space Out to pass through the filter portion 95.

Referring to FIGS. 7A to 7C, each of the sections constituting part of the air flow path P will be described below. The air flow path P may comprise a shared section P0 which commonly constitutes part of the bypass flow path Pa and part of the filtering flow path Pb and Pc. The shared section P0 may commonly constitute part of the circulation flow path Pa and Pb and part of the ventilation flow path Pc. The shared section P0 may allow air to be directed out to the treatment space 10s. The air flow path P may comprise an inner inlet section P1 through which the air in the treatment space 10s is admitted. The air flow path P may comprise a filter pass-through section P2 in which the air is directed to pass through the filter portion 95. The air flow path P may comprise a filter bypass section P3 in which the air bypasses the filter portion 95. The air flow path P may comprise an outside air inlet section P4 through which the air is directed in from the outer space Ou.

The valve 70 is disposed at a point where the inner inlet section P1, the filter pass-through section P2, and a filter bypass section P3 branch off from one another. The filter pass-through section P2 and the filter bypass section P3 branch off and are connected together at a downstream end of the inner inlet section P1. The branch-off point is disposed at the downstream end of the inner inlet section P1. The branch-off point is disposed at an upstream end of the filter pass-through section P2. The branch-off point is disposed at an upstream end of the filter bypass section P3. A configuration space 42s for the valve 70 is located at the branch-off point.

The valve 70 alters the connection and shut-off relationships among the inner inlet section P1, filter pass-through section P2, and filter bypass section P3 depending on the angle of rotation. Referring to FIGS. 7A to 7C, the valve 70 may shut off at least one of the inner inlet section P1, filter pass-through section P2, and filter bypass section P3 from the other two. Referring to FIGS. 7A and 7B, the valve 70 may connect together two of the inner inlet section P1, filter pass-through section P2, and filter bypass section P3 depending on the angle of rotation. Referring to FIG. 7C, the valve 70 is configured in such a way as to select one of a plurality of modes depending on the angle of rotation. Referring to FIG. 7A, the plurality of modes comprise a first mode in which the inner inlet section P1 and the filter bypass section P3 are connected together. Referring to FIG. 7B, the plurality of modes comprise a second mode in which the inner inlet section P1 and the filter pass-through section P2 are connected together. Referring to FIG. 7C, the plurality of modes comprise a third mode in which the filter pass-through section P2 is shut off from the inner inlet section P1 and the filter bypass section P3 and the filter bypass section P3 is shut off from the inner inlet section P1.

Referring to FIG. 7A, the bypass circulation flow path Pa may be formed by sequentially connecting the inner inlet section P1, filter bypass section P3, and shared section P0. The bypass circulation flow path Pa is selected when the valve 70 connects the inner inlet section P1 and the filter bypass section P3. When the bypass circulation flow path Pa is selected, the filter pass-through section P2 is shut off from the inner inlet section P1 and the filter bypass section P3. In this case, referring to FIG. 7A and FIG. 4A, the outer intake portion 47 closes the outside air inlet section P4, and the outer discharge portion 48 closes the exhaust air outlet section P5. Air enters the inner inlet section P1 from the treatment space 10s through the inner intake opening 41. Air enters the filter bypass section P3 from the inner inlet section P1 by means of the valve 70. The air that has passed through the filter bypass section P3 enters the shared section P0. The air that has passed through the shared section P0 is discharged to the treatment space 10s through the inner discharge opening 44. In this case, the air does not flow in and out between the outer space Ou and the treatment space 10s.

Referring to FIG. 7B, the filter circulation flow path Pb is formed by sequentially connecting the inner inlet section P1, filter pass-through section P2, and shared section P0. The filtering circulation flow path Pb is selected when the valve 70 connects the inner inlet section P1 and the filter pass-through section P2. When the filtering circulation flow path Pb is selected, the filter bypass section P3 is shut off from the inner inlet section P1 and the filter pass-through section P2. In this case, referring to FIG. 7A and FIG. 4A, the outer intake portion 47 closes the outside air inlet section P4, and the outer discharge portion 48 closes the exhaust air outlet section P5. Air enters the inner inlet section P1 from the treatment space 10s through the inner intake opening 41. Air enters the filter pass-through section P2 from the inner inlet section P1 by means of the valve 70. The air that has passed through the filter portion 95 in the filter pass-through section P2 is admitted to the shared section P0. The air that has passed through the shared section P0 is discharged to the treatment space 10s through the inner discharge opening 44. In this case, the air does not flow in and out between the outer space Ou and the treatment space 10s.

Referring to FIG. 7C, the ventilation flow path Pc may be formed by sequentially connecting the outside air inlet section P4, filter pass-through section P2, and shared section P0. The ventilation flow path Pc is selected when the outside air inlet section P4 and the filter pass-through section P2 are connected together. When the ventilation flow path Pc is selected, the filter pass-through section P2 is shut off from the inner inlet section P1 and the filter bypass section P3. When the ventilation flow path Pc is selected, the valve 70 shuts off the filter bypass section P3 from the inner inlet section P1. In this case, referring to FIG. 7C and FIG. 4A, the outer intake portion 47 opens the outside air inlet section P4, and the outer discharge portion 48 opens the exhaust air outlet section P5. Air enters the outside air inlet section P4 from the outer space Ou. Air enters the filter pass-through section P2 from the outside air inlet section P4 through the outside air connecting port 45. The air that has passed through the filter portion 95 in the filter pass-through section P2 is admitted to the shared section P0. The air that has passed through the shared section P0 is discharged to the treatment space 10s through the inner discharge opening 44. Also, the air in the treatment space 10s is released to the outer space Ou through the exhaust air outlet section P5.

Figure 6:
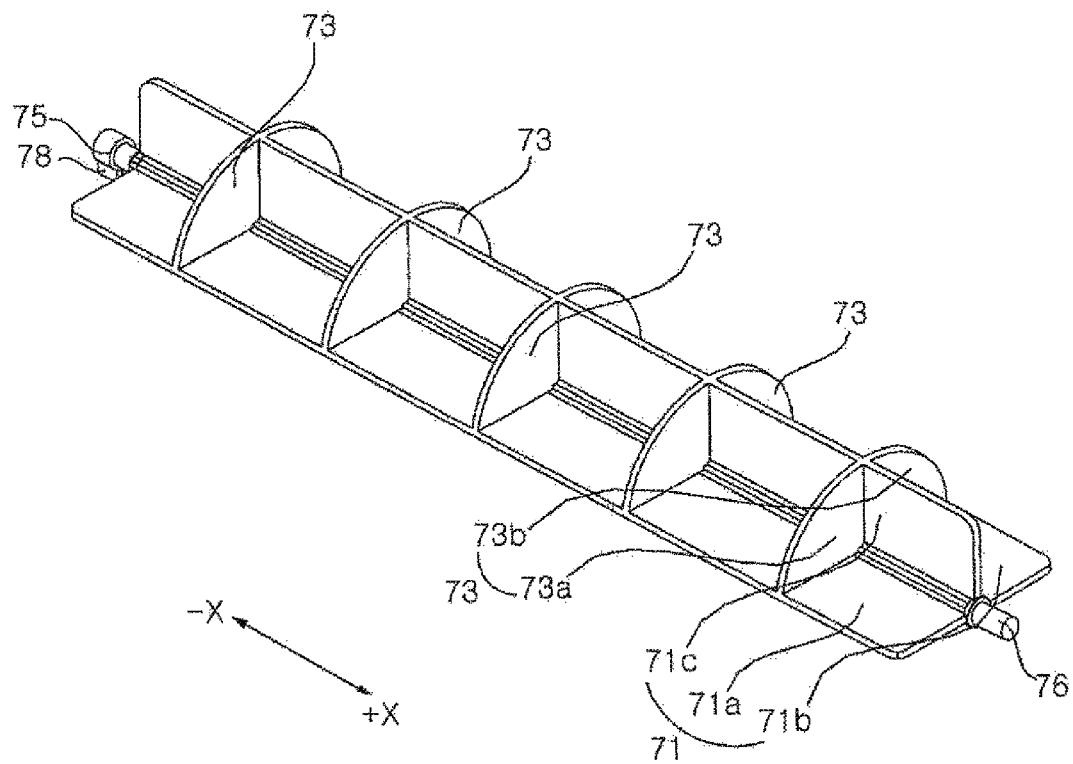
FIG. 6 is a perspective view of the valve 70 according to an exemplary embodiment of the clothes treatment apparatus 1 of FIG. 1.

Hereinafter, referring to FIGS. 6 to 7C, the valve 70 and the valve actuating module 80 will be described in detail below.

As the valve 70 is actuated, it allows for switching the selected flow path from one of the plurality of flow paths Pa, Pb, and Pc to another flow path. The actuation of the valve 70 may refer to the rotation of the valve 70. As the valve 70 rotates, it may switch from either the circulation flow path Pa or the filtering flow path Pb and Pc to the other. As the valve 70 rotates, it may switch from either the circulation flow path Pa and Pb or the ventilation flow path Pc to the other. As the valve 70 rotates, it may switch from one among the bypass circulatory path Pa, filtering flow path Pb and Pc, and ventilation flow path Pc to another.

The valve 70 may rotate around a predetermined rotational axis Ov. The rotational axis Ov is a virtual axis used to describe the present disclosure, and does not designate an actual component of the apparatus. The rotational axis Ov may extend along the center of the configuration space 42s. The rotational axis Ov may be placed horizontally. The rotational axis Ov may extend in the left and right direction. The rotational axis Ov may be located in front of the filter module 90. The rotational axis Ov may be located between the filter module 90 and the inner intake opening 41.

The entire valve 70 runs lengthwise along the rotational axis Ov. The entire valve 70 runs lengthwise in the left and right direction.

The valve 70 comprises a shaft portion (not shown) that extends along the rotational axis Ov. The valve 70 comprises a shut-off portion 71 that protrudes in a centrifugal direction from the rotational axis Ov. The shut-off portion 71 protrudes from the shaft portion in a centrifugal direction. The shut-off portion 71 forms a centrifugal end at a position corresponding to a predetermined radius of rotation. The shut-off portion 71 may extend in parallel with the rotational axis Ov.

The shut-off portion 71 may be formed in such a way as to be opened within the range of a predetermined angle with respect to the rotational axis Ov. The shut-off portion 71 may be formed in such a way as to be opened at least at 180 degrees with respect to the rotational axis Ov. In this exemplary embodiment, the shut-off portion 71 is formed in such a way as to be opened at 180 degrees with respect to the rotational axis Ov.

The valve 70 may comprise a first shut-off portion 71a that protrudes in a certain centrifugal direction (first centrifugal direction) with respect to the rotational axis Ov. The first shut-off portion 71a may be formed in the shape of a plate. The first shut-off portion 71a extends in parallel with the rotational axis Ov.

The valve 70 may comprise a second shut-off portion 71b that protrudes in the direction (second centrifugal direction) opposite to the certain centrifugal direction (first centrifugal direction) with respect to the rotational axis Ov. The second shut-off portion 71b may be formed in the shape of a plate. The second shut-off portion 71b extends in parallel with the rotational axis Ov. The first shut-off portion 71a and the second shut-off portion 71b may be placed in the same plane.

The valve 70 may comprise a third shut-off portion 71c that protrudes in another centrifugal direction (third centrifugal direction), within the range of an angle between the first shut-off portion 71a and the second shut-off portion 71b with respect to the rotational axis Ov. The third shut-off portion 71c may be formed in the shape of a plate. The third shut-off portion 71b extends in parallel with the rotational axis Ov. The third shut-off portion 71c may be placed perpendicular to the first shut-off portion 71a. The third shut-off portion 71c may be placed perpendicular to the second shut-off portion 71b.

A first distance from the rotational axis Ov to the centrifugal end of the first shut-off portion 71a, a second distance from the rotational axis Ov to the centrifugal end of the second shut-off portion 71b, and a third distance from the rotational axis Ov to the centrifugal end of the third shut-off portion 71c are all the same.

Although not shown, another example may be given in which the shut-off portion may form a curve that faces in a centrifugal direction within the range of a predetermined angle with respect to the rotational axis Ov. For example, the shut-off portion may form a curve that faces in a centrifugal direction in the range of about 180 degrees with respect to the rotational axis Ov. In this case, the shut-off portion may be formed in the shape of an integrated semicircular column.

The valve 70 may further comprise a guide rib 73 that runs across the first shut-off portion 71a, second shut-off portion 71b, and third shut-off portion 71c. The guide rib 73 protrudes in a centrifugal direction with respect to the rotational axis Ov and extend in a circumferential direction. The guide rib 73 may be formed in the shape of a plate perpendicular to the rotational axis Ov. The distance from the rotational axis Ov to a centrifugal end of the guide rib 73 may be equal to or shorter than the radius of rotation with respect to the rotational axis Ov. A plurality of guide ribs 73 may be spaced apart from one another along the rotational axis Ov.

The guide rib 73 may comprise a first guide rib 73a placed within the range of an angle between the first shut-off portion 71a and the third shut-off portion 71c with respect to the rotational axis Ov. The guide rib 73 may comprise a second guide rib 73b placed within the range of an angle between the second shut-off portion 71b and the third shut-off portion 71c with respect to the rotational axis Ov.

The valve 70 may comprise a power shaft portion 75 that receives torque from a motor (not shown). The power shaft portion 75 may be placed on the rotational axis Ov. The power shaft portion 75 is disposed on one end of the shaft portion of the valve 70. The valve 70 comprises a support shaft portion 76 disposed on the other end of the shaft portion of the valve 70. The support shaft portion 76 may be rotatably supported by the flow path body 26.

The valve 70 may comprise a stopper 78 that restricts the range of rotation of the valve 70. The stopper 78 may restrict the range of rotation of the valve 70 as it gets stuck on the flow path body 26. The stopper 78 may protrude in a centrifugal direction from the rotational axis Ov. The stopper 78 may protrude in a centrifugal direction from the power shaft portion 75. In another example, the stopper 78 may protrude in a centrifugal direction from the support shaft portion 76.

The flow path body 26 may comprise a valve support portion (not shown) that rotatably supports the valve 70. A pair of valve support portions may be provided on two opposite ends 75 and 76 of the shaft portion of the valve 70. The valve support portion may rotatably support the power shaft portion 75 of the valve 70. The valve support portion may rotatably support the support shaft portion 75 of the valve 70.

The flow path body 26 may comprise a valve limit (not shown) that restricts the range of rotation of the valve 70. The valve limit may set a specific angle of rotation of the valve 70. The valve limit may be configured in such a way as to come into contact with the stopper 78 of the valve 70. As the stopper 78 gets stuck on the valve limit, the range of rotation of the valve 70 may be restricted.

The flow path body 26 forms a configuration space 42s in which the valve 70 is placed. The shut-off portion 71 is disposed in the configuration space 42s. The configuration space 42s forms part of the air flow path P.

The configuration space 42s is disposed downstream of the inner intake opening 41. The configuration space 42s may be disposed at the downstream end of the inner inlet section P1. The configuration space 42s may be disposed at the upstream end of the filter bypass section P3. The configuration space 42s may be disposed at the upstream end of the filter pass-through section P2.

The configuration space 42s is disposed in a way that connects between the inner inlet section P1 and the filter bypass section P3. The configuration space 42s is disposed in a way that connects between the inner inlet section P1 and the filter pass-through section P2.

A first connecting port 42a is provided to connect the configuration space 42s and the inner inlet section p1. A second connecting port 42b is provided to connect the configuration space 42s and the filter pass-through section P2. A third connecting port 42c is provided to connect the configuration space 42s and the filter bypass section P3.

Air may move from the inner inlet section P1 to the configuration space 42s through the first connecting port 42a. Air may move from the configuration space 42s to the filter pass-through section P2 through the second connecting port 42b. Air may move from the configuration space 42s to the filter bypass section P3 through the third connecting port 42c.

In the first mode, the valve 70 connects the first connecting port 42a and the third connecting port 42c and shuts off the second connecting port 42b from the first and third connecting ports 42a and 42c. Therefore, the air passing through the inner inlet section P1 moves to the filter bypass section P3 through the configuration space 42s (see FIG. 7A).

In the second mode, the valve 70 connects the first connecting port 42a and the second connecting port 42b and shuts off the third connecting port from the first and second connecting ports 42a and 42b. Therefore, the air passing through the inner inlet section P1 moves to the filter pass-through section P2 through the configuration space 42s (see FIG. 7B).

In the third mode, the valve 70 shuts off all the connections among the first to third connecting ports 42a, 42b, and 42c. Therefore, air cannot pass through the inner inlet section P1 and the configuration space 42s (see FIG. 7C).

The flow path body 26 comprises a shut-off corresponding portion 26d that forms the configuration space 42s. The shut-off corresponding portion 26d may mark off the outer peripheral surface of the configuration space 42s.

The shut-off corresponding portion 26d is formed in a position corresponding to the radius of rotation of the shut-off portion 71 from the rotational axis Ov. The shut-off corresponding portion 26d is configured in such a way as to come into contact with the centrifugal end of the shut-off portion 71. The shut-off corresponding portion 276d may form a curve that extends along the rotational trajectory of the centrifugal end of the shut-off portion 71.

The shut-off corresponding portion 26d comprises a first shut-off corresponding portion 26d1 located between the first connecting port 42a and the second connecting port 42b. The shut-off corresponding portion 26d comprises a second shut-off corresponding portion 26d2 located between the second connecting port 42b and the third connecting port 42c. The shut-off corresponding portion 26d comprises a third shut-off corresponding portion 26d3 located between the third connecting port 42c and the first connecting port 42a.

In the first mode, the shut-off portion 71 makes contact with the first shut-off corresponding portion 26d1 and the second shut-off corresponding portion 26d2 but is separated from the third shut-off corresponding portion 26d3. In the first mode, the first shut-off portion 71a makes contact with the first shut-off corresponding portion 26d1, the second shut-off portion 71b makes contact with the second shut-off corresponding portion 26d2, and the third shut-off portion 71c is disposed in the opposite direction of the third shut-off corresponding portion 26d3 with respect to the rotational axis Ov. Therefore, the first connecting port 42a and the third connecting port 42c are connected (see FIG. 7A).

In the second mode, the shut-off portion 71 makes contact with the second shut-off corresponding portion 26d2 and the third shut-off corresponding portion 26d3 but is separated from the first shut-off corresponding portion 26d1. In the second mode, the first shut-off portion 71a makes contact with the second shut-off corresponding portion 26d2, the second shut-off portion 71b makes contact with the third shut-off corresponding portion 26d3, and the third shut-off portion 71c is disposed in the opposite direction of the first shut-off corresponding portion 26d1 with respect to the rotational axis Ov. Therefore, the first connecting port 42a and the second connecting port 42b are connected (see FIG. 7B).

In the third mode, the shut-off portion 71 makes contact with the first shut-off corresponding portion 26d1, second shut-off corresponding portion 26d2, and third shut-off corresponding portion 26d3. In the third mode, the first shut-off portion 71a makes contact with the second shut-off corresponding portion 26d2, the second shut-off portion 71b makes contact with the first shut-off corresponding portion 26d1, and the third shut-off portion 71c makes contact with the third shut-off corresponding portion 26d3. Therefore, the first connecting port 42a, second connecting port 42b, and third connecting port 42c are shut off from one another (see FIG. 7C).

The valve actuating module 80 may be fixed to the flow path body 26. The valve actuating module 80 may be fixed to the outer side of the flow path body 26. The valve actuating module 80 may rotate the valve 70. The valve actuating module 80 may adjust the angle of rotation of the valve 70.

The valve actuating module 80 is configured in such a way that one of the plurality of modes is selected by rotating the valve 70. The valve actuating module 80 may control the valve 70 to put it into one of the first, second, and third modes.

The valve actuating module 80 comprises a motor (not shown) for generating torque. The motor provides torque to rotate the valve 70. The motor comprises a motor shaft (not shown) protruding to one side. The motor allows for manipulation of the angle of rotation of the valve 70 by forward and backward rotations.

The valve actuating module 80 may comprise a module casing (not shown) that accommodates the motor in it. The module casing may be supported by the flow path body 26. The valve limit may be disposed in the module casing.

In an example, the motor may be connected directly to the valve 70 so that the motor shaft (not shown) and the valve 70 rotate as a single unit. In this case, the motor shaft is placed on the rotational axis Ov.

In another example, the valve actuating module 80 may comprise a power transmitting portion (not shown) that transmits the torque of the motor to the valve 70. The power transmitting portion may comprise a gear, belt, and/or pulley.

While the stopper 78 is stuck on the valve limit, the motor shaft also is constrained and stops rotating. By constraining the rotation of the motor and rotating the motor in steps, the angle of rotation of the valve 70 may be controlled. Here, the forward rotation of the motor shaft refers to rotating the motor shaft to rotate the valve 70 clockwise when viewed from the right, and the backward rotation of the motor shaft refers to rotating the motor shaft to rotate the valve 70 counterclockwise when viewed from the right.

To adjust the angle of rotation of the valve 70 to a specific angle, the motor shaft may be rotated enough either forward or backward until it is constrained by the valve limit, and then rotated (in steps) in the opposite direction by a certain angle or rotation.

In an example, the motor shaft may be rotated enough backward so that the valve 70 selects the first mode (as in FIG. 7A) while the valve 70 is fully rotated counterclockwise. When the first mode is selected by the valve 70, the motor shaft may be rotated forward by a predetermined angle of rotation so that the valve 70 rotates clockwise and selects the second mode (as in FIG. 7B). When the first mode is selected by the valve 70, the motor shaft may be rotated forward by a predetermined angle of rotation so that the valve 70 rotates clockwise and selects the third mode (as in FIG. 7C).

The angle of rotation may be preset to an appropriate value depending on the gear ratio. If the rotational speed of the motor is constant, the angle of rotation may be controlled by the rotation time preset for the motor.

By controlling the valve actuating module 80, the control part 2 may always reset the angle of rotation of the valve 70 to a predetermined reference angle of rotation when the clothes treatment apparatus 1 is powered on.

Figure 8:
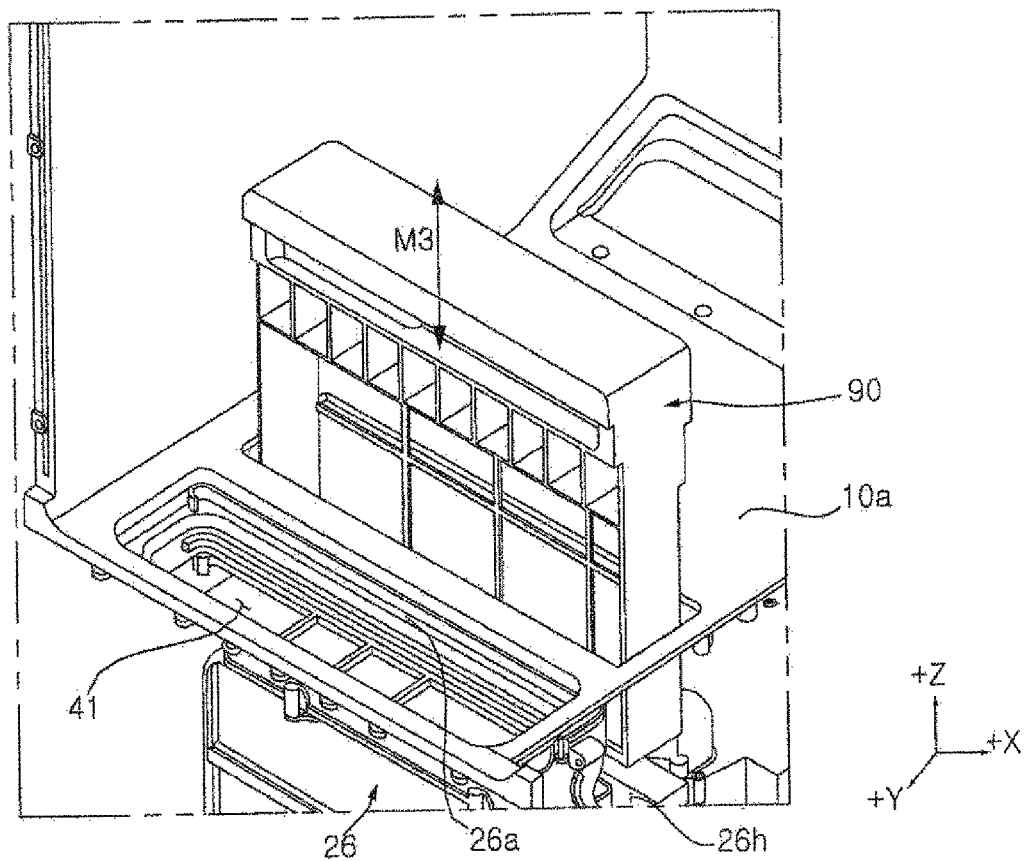
FIG. 8 is a partial perspective view showing the cover 25 being removed from the cabinet 10 of the clothes treatment apparatus 1 of FIG. 3 and the filter module 90 being pulled out.
Figure 9:
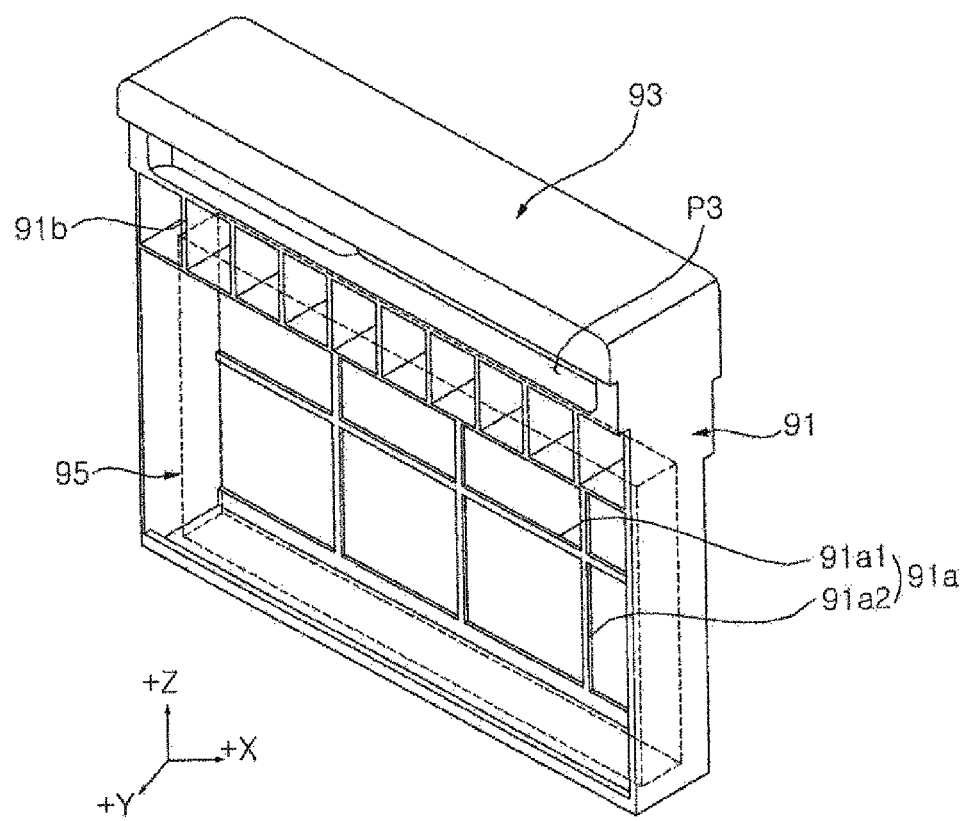
FIG. 9 is a perspective view of the filter module 90 of FIG. 8.
Figure 10:
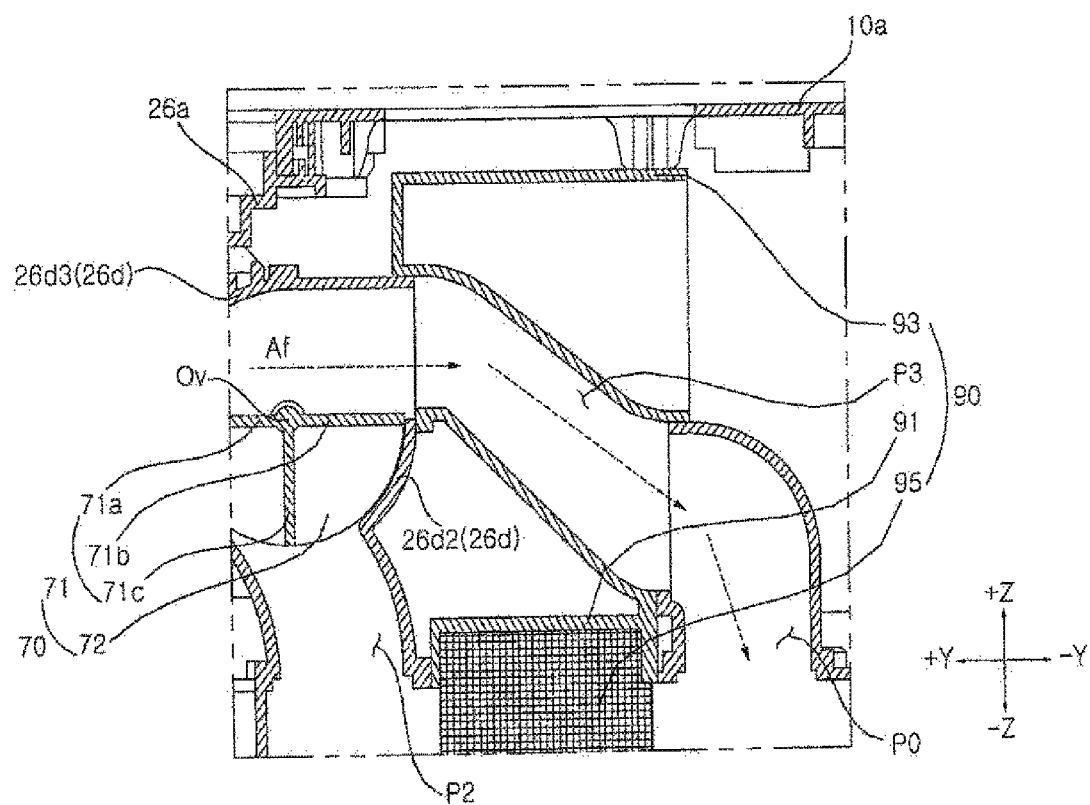
FIG. 10 is an enlarged partial cross-sectional view of the filter bypass section P3 of the filter module 90 of FIG. 7A.

Referring to FIGS. 8 to 10, the filter module 90 is placed across the filtering flow path Pb and Pc. The filter module 90 is placed across the bypass flow path Pa. The filter module 90 may be placed across the filter pass-through section P2 and the filter bypass section P3. In this case, the filter portion 95 of the filter module 90 is placed only in the filter pass-through section P2, filter bypass section P3, and filter pass-through section P2.

The filter module 90 is configured in such a way as to be pushed into or pulled out of a filter module insertion opening 26h formed in the flow path body 26. While the filter module 90 is fully inserted into the filter module insertion opening 26h, the filter portion 95 is placed in the filter pass-through section P2 on the air flow path P.

The filter module 90 is configured in such a way as to be pushed in or pulled out in a predetermined direction M3 of insertion and removal motion. The filter module 90 is configured in such a way as to be pulled out in a direction across the filtering flow path Pb and Pc. The filter module 90 may be configured in such a way as to be pulled out in a direction across the bypass flow path Pa. In this exemplary embodiment, the filter module 90 is configured in such a way as to be pulled out upward. The filter module 90 is configured in such a way as to be pulled out from the bottom side of the treatment space 10s.

The filter module 90 comprises a filter portion 95 for filtering out impurities passing through it. The filter portion 95 is functionally different from an auxiliary filter portion to be described later. The filter portion 95 may filter out even minute particles compared to the auxiliary filter portion.

The filter portion 95 may comprise a high efficiency particulate air filter (HEPA). The HEPA filter should be replaced because it is a consumable item. The HEPA filter filters out very fine dust, bacteria, mold, etc. For example, the HEPA filter has a filtration efficiency of 99.97% for particles that are about 0.3 p. For example, the HEPA filter may be formed of a material of glass fiber or asbestos fiber.

The HEPA filter cannot be washed with water and can be cleaned using a brush or the like. Thus, it is necessary that no more than a predetermined amount of steam passes through the HEPA. The filtering flow path Pb and Pc enables it to take advantage of the high-performance functions of the HEPA filter, and the bypass flow path Pa allows for guiding steam not to pass through the HEPA when supplied into the treatment space through the steam module 7.

The filter module 90 comprises a filter body portion 91 that supports the filter portion 95. The filter portion 95 may be removably placed at the filter body portion 91. To replace the filter portion 95, the filter body portion 91 may be pulled out from the flow path body 26, and then the filter portion 95 may be removed from the filter body portion 91.

The filter module 90 may comprise a handle 93 provided to let the user hold the filter module 90 with a hand, while the filter body portion 91 is fully inserted into the flow path body 26. The handle 93 is fixed to the filter body portion 91. The handle 93 may be disposed on the top of the filter body portion 91. The handle 93 may be configured in such a way as to be exposed to the bottom side of the treatment space 10s. The handle 93 may be disposed on the rear of the cover 25 within the treatment space 10s. The user may pull out the filter module 90 by opening the door 15 and grabbing the handle 93 with a hand.

The filter body portion 91 comprise a filter placement portion 91a where the filter portion 95 is placed. The filter placement portion 91a guides the position of the filter portion 95. The filter placement portion 91a makes contact with one side of the filter portion 95. The filter placement portion 91a may have a lattice structure. The filter placement portion 91a may comprise a first placement portion 91a1 extending horizontally and a second placement portion 91a2 extending vertically. Air passes through an opening formed by the filter placement portion 91a.

The filter body portion 91 comprises a frame portion 91b that sets a relative positional relationship between the handle 93 and the filter portion 95. The frame portion 91b may surround the perimeter of the filter portion 95. The frame portion 91b has a structure that keeps a predetermined distance between the filter portion 95 and the handle 93.

The filter module 90 has a hole P3 constituting at least part of the filter bypass section P3. The hole P3 is disposed to penetrate the filter body portion 91. The hole P3 is located in the frame portion 91b. The hole P3 may be located above the filter portion 95. The hole P3 may be formed to run to the left and right. The hole P3 may penetrate the front and rear of the filter module 90. The hole P3 may slope downward to the rear. An upstream end of the hole P3 may be connected to the configuration space 42s. The air in the configuration space 42s may move to the hole P3 through the third connecting port 42c. Through this, the filter module 90 may be easily pushed into or pulled out from the cabinet 10, without getting in the way of the formation of the filter bypass section P3.

Referring to FIGS. 3 and 9, the cover 25 may form the inner intake opening 41 through which air is admitted to the bypass flow path Pa and the filtering flow path Pb. The inner intake opening 41 may be formed by a gap between the cover 25 and the bottom side of the treatment space 10s. The cover 25 may cover the inner intake opening 41 from above.

The cover 25 may be removably placed on the cabinet 10. The cover 25 may be removably placed on the interior cabinet 10a. The cover 25 may be placed in such a way as to be removable from the bottom side of the treatment space 10s.

The flow path body 26 may comprise a cover support portion 26a that supports the cover 25. The cover support portion 26a may form part of the air flow path P. The cover support portion 26a may form at least part of the inner intake opening P1. The cover support portion 26a may be in the shape of a column that forms the air flow path P in it. The upper end of the cover support portion 26a may be connected to the bottom side of the treatment space 10s. The cover support portion 26a may have a stepped portion where a cover supporter to be described later is placed.

The cover 25 may comprise a cover body (not shown) supported by the cover support portion 26a. The cover body may comprise a cover portion (not shown) that forms a flat surface vertically separated from the bottom side of the treatment space 10s. The cover portion, when viewed from above, conceals the inner intake opening 41. The cover body may comprise a cover supporter (not shown) supporting the cover portion. The upper end of the cover supporter may be fixed to the lower side of the cover portion, and the lower end may come into contact with the cover support portion 26a. The cover supporter may extend downward from the cover portion to a specific point, and may be bent horizontally at the specific point. A pair of left and right cover supporters may be symmetrically placed. A gap between the cover supporter and the cover portion may form at least part of the inner intake opening 41.

The cover 25 may comprise a fragrance sheet (not shown). The fragrance sheet may have a fragrance added to ambient air that makes the user feel fresh. By including the fragrance sheet in the cover 25 forming the inner intake opening 41, fragrance may be added efficiently to the air passing through the bypass flow path Pa and the filtering flow path Pb.

Although not shown, the auxiliary filter (not shown) may be disposed upstream of the configuration space 42s. The auxiliary filter may be disposed upstream of the filter module 90. The auxiliary filter may be disposed downstream of the cover 25. The auxiliary filter may be disposed downstream of the inner intake opening 41. The auxiliary filter may be disposed on the lower side of the cover 25.

The auxiliary filter may be supported by the flow path body 26. The auxiliary filter may be removably placed. The auxiliary filter may be removably placed on the interior cabinet 10a. The auxiliary filter may be placed in such a way as to be removable from the bottom side of the treatment space 10s. The user may remove the auxiliary filter after opening the door 15 and removing the cover 25. One side of the auxiliary filter may be exposed, with the cover 25 being removed from the cabinet 10.

The auxiliary filter may comprise an auxiliary filter portion (not shown) that filters out impurities from the air moving to the bypass flow path Pa and filtering flow path Pb through the inner intake opening 41. The auxiliary filter portion may be placed horizontally. The auxiliary filter portion filters out dust from the air passing through it, but may be functionally different from the filter portion 95. The auxiliary filter portion is not the HEPA filter. The auxiliary filter portion may form a mesh filter, for example. The auxiliary filter portion may only filter out relatively large impurities, compared to the filter portion 95. The auxiliary filter portion is configured in such a way that steam can pass through it. Through this, a filtering function may be added to both the bypass flow path Pa and the filtering flow path Pb, by means of the single auxiliary filter.

The filter module 90 comprises an auxiliary body portion (not shown) supporting the auxiliary filter portion. The auxiliary body portion may be placed across the direction Af of air flow. The auxiliary body portion has a plurality of openings, and the auxiliary filter portion is placed at the plurality of openings.

Hereinafter, referring to FIG. 5 and FIGS. 7A to 7C, a plurality of modes will be described below in details. The control part 2 is configured to select one of a plurality of preset modes. The control part 2 may control various components in the clothes treatment apparatus 1 according to the selected mode.

The plurality of modes may be distinguished depending on whether they allow air to be filtered by the filter portion 95. The plurality of modes may comprise at least one bypass mode and at least one filtering mode.

In the bypass mode, the control part 2 controls the steam module 7 to spray steam into the treatment space 10s. In the bypass mode, the control part 2 controls the fan 50 to bring it into operation. In the bypass mode, the control part 2 controls the valve actuating module 80 so as to select the bypass flow path Pa from among the plurality of flow paths. Therefore, a treatment can be done while circulating the air in the treatment space 10s, without allowing the steam supplied to the treatment space 10s to pass through the filter portion 95.

In the filtering mode (filtering circulation mode and ventilation mode), the control part 2 controls the steam module 7 not to spray steam into the treatment space 10s. In the ventilation mode, the control part 2 controls the fan 50 to bring it into operation. In the ventilation mode, the control part 2 may control in such a way that the filtering flow path Pb and Pc is selected from among the plurality of flow paths.

The plurality of modes may be distinguished depending on whether they allow for air circulation in the treatment space 10s. The plurality of modes may comprise at least one ventilation mode and at least one ventilation mode.

In the circulation mode (bypass circulation mode and filtering circulation mode), the control part 2 controls the fan 50 to bring it into operation. In the circulation mode, the control part 2 controls the valve actuating module 80 so as to select the circulation flow path Pa and Pb from among the plurality of flow paths.

When the circulation mode is selected, the bypass circulation flow path Pa or the filtering circulation flow path Pb is selected from among the plurality of flow paths. When the bypass circulation flow path Pa or the filtering circulation flow path Pb is selected, the control part 2 controls in such a way that the outer intake portion 47 and the outer discharge portion 48 are closed. That is, the outer intake portion 47 closes the outside air inlet section P4, and the outer discharge portion 48 closes the exhaust air outlet section P5.

In the ventilation mode, the control part 2 controls the fan 50 to bring it into operation. In the ventilation mode, the control part 2 controls the valve actuating module 80 so as to select the ventilation flow path Pc from among the plurality of flow paths.

When the ventilation mode is selected, the ventilation flow path Pc is selected from among the plurality of flow paths. When the ventilation flow path Pc is selected, the control part 2 controls in such a way that the outer intake portion 47 and the outer discharge portion 48 are opened. That is, the outer intake portion 47 opens the outside air inlet section P4, and the outer discharge portion 48 opens the exhaust air outlet section P5.

The plurality of modes may comprise a bypass circulation mode, a filtering circulation mode, and a ventilation mode. The plurality of modes may be selected through the user's input using the input part 3. The plurality of modes may be selected and performed at different time slots in a single clothes treatment process. The plurality of modes may be selected and performed differently based on information sensed by the sensing part 4.

In the bypass circulation mode, the control part 2 controls the steam module 7 to spray steam into the treatment space 10s. In the bypass circulation mode, the control part 2 controls the fan 50 to bring it into operation. In the bypass circulation mode, the control part 2 controls the valve actuating module 80 so as to select the bypass circulation flow path Pa from among the plurality of flow paths. In the bypass circulation mode, the angle of rotation is adjusted so that the valve 70 selects the first mode. In the bypass circulation mode, the control part 2 controls in such a way that the outer intake portion 47 and the outer discharge portion 48 are closed. The bypass circulation mode can facilitate efficient supply of steam to clothes.

In the filtering circulation mode, the control part 2 controls the steam module 7 not to spray steam into the treatment space 10s. In the filtering circulation mode, the control part 2 controls the fan 50 to bring it into operation.

In the filtering circulation mode, the control part 2 controls the valve actuating module 80 so as to select the filtering circulation flow path Pb from among the plurality of flow paths. In the filtering circulation mode, the angle of rotation is adjusted so that the valve 70 selects the second mode. In the filtering circulation mode, the control part 2 controls in such a way that the outer intake portion 47 and the outer discharge portion 48 are closed. In the filtering circulation mode, the control part 2 may control the hanger module 30 so as to make it vibrate. The filtering circulation mode allows for efficient removal of impurities clinging to clothes.

In the bypass circulation mode and the filtering circulation mode, the control part 2 may vary the vibration pattern of the hanger module 30. In an example, the control part 2 may control the hanger module 30 to vibrate relatively slowly in the bypass circulation mode and relatively fast in the filtering circulation mode.

In the ventilation mode, the control part 2 may control the steam module 7 not to spray steam into the treatment space 10s. In the ventilation mode, the control part 2 controls the fan 50 to bring it into operation. In the ventilation mode, the control part 2 may control the valve actuating module 80 so as to select the ventilation flow path Pc from among the plurality of flow paths. In the filtering circulation mode, the angle of rotation is adjusted so that the valve 70 selects the third mode. In the ventilation mode, the control part 2 controls in such a way that the outer intake portion 47 and the outer discharge portion 48 are opened. In the ventilation mode, the control part 2 may control the hanger module 30 not to vibrate. The ventilation mode allows for efficient removal of humidity or odorous components in clothes. Moreover, in the ventilation mode, dust or odorous components in the treatment space 10s may be released to the outside, thereby improving the quality of the space in which clothes are stored.

What is claimed is:
1. A clothes treatment apparatus comprising:
 a cabinet forming a treatment space for storing clothes;
 a filter module having a filter portion for filtering out dust from air passing therethrough;
 an air flow path having a plurality of preset flow paths for directing air to be discharged into the treatment space;
 a fan for moving the air in the air flow path;
 a single valve disposed on the air flow path, that changes the air flow path by rotating around a predetermined rotational axis;
 a valve actuating module for rotating the valve; and
 a control part for controlling the angle of rotation of the valve so as to select one of the plurality of flow paths, the plurality of flow paths comprising:
  at least one bypass flow path for directing the air to bypass the filter portion; and
  at least one filtering flow path for directing the air to pass through the filter portion,
 wherein the at least one filtering flow path includes a ventilation flow path for directing air drawn in from an outer space of the cabinet to pass through the filter portion.
2. The clothes treatment apparatus of claim 1, further comprising a steam module for supplying steam into the treatment space, wherein the filter portion comprises a HEPA filter.
3. The clothes treatment apparatus of claim 1, wherein the air flow path comprises:
 an inner inlet section through which the air in the treatment space is admitted;

a filter bypass section in which the air bypasses the filter portion; and a filter pass-through section in which the air passes through the filter portion, wherein the valve is disposed at a point where the inner inlet section, the filter pass-through section, and the filter bypass section branch off from one another.

4. The clothes treatment apparatus of claim 3, wherein the at least one bypass flow path comprises a bypass circulation flow path which is selected when the valve connects the inner inlet section and the filter bypass section, and the at least one filtering flow path comprises a filtering circulation flow path which is selected when the valve connects the inner inlet section and the filter pass-through section.

5. The clothes treatment apparatus of claim 4, wherein, when the bypass circulation flow path is selected, the valve shuts off the filter pass-through section from the inner inlet section and the filter bypass section, and, when the filtering circulation flow path is selected, the valve shuts off the filter bypass section from the inner inlet section and the filter pass-through section.

6. The clothes treatment apparatus of claim 3, wherein the ventilation flow path directs air passed through the filter portion to the treatment space.

7. The clothes treatment apparatus of claim 6, wherein the air flow path further comprises an outside air inlet section through which air is drawn in from the outer space of the cabinet, wherein the ventilation flow path is selected to connect the outside air inlet section and the filter pass-through section, shut off the filter pass-through section from the inner inlet section and the filter bypass section, and shut off the filter bypass section from the inner inlet section.

8. The clothes treatment apparatus of claim 1, wherein the air flow path comprises:

an inner inlet section through which air is admitted;

a filter bypass section in which the air bypasses the filter portion; and a filter pass-through section in which the air passes through the filter portion, wherein the valve alters the connection and shut-off relationships among the inner inlet section, filter pass-through section, and filter bypass section depending on the angle of rotation.

9. The clothes treatment apparatus of claim 8, wherein the valve is configured in such a way as to select one of a plurality of modes depending on the angle of rotation, the plurality of modes comprising:

a first mode in which the inner inlet section and the filter bypass section are connected together;

a second mode in which the inner inlet section and the filter pass-through section are connected together; and a third mode in which the filter pass-through section is shut off from the inner inlet section and the filter bypass section and the filter bypass section is shut off from the inner inlet section.

10. The clothes treatment apparatus of claim 8, wherein the filter module is placed across the filtering flow path and the bypass flow path and has a hole constituting at least part of the filter bypass section.

11. The clothes treatment apparatus of claim 1, wherein the air flow path comprises:

an inner inlet section through which air is admitted;

a filter bypass section in which the air bypasses the filter portion; and a filter pass-through section in which the air passes through the filter portion, wherein the valve comprises a shut-off portion that protrudes in a centrifugal direction from the rotational axis, the clothes treatment apparatus comprises a shut-off corresponding portion that is formed in a position corresponding to the radius of rotation of the shut-off portion from the rotational axis, and a first connecting port for connecting the configuration space and the inner inlet section, a second connecting port for connecting the configuration space and the filter pass-through section, and a third connecting port for connecting the configuration space and the filter bypass section are provided.

12. The clothes treatment apparatus of claim 11, wherein the shut-off corresponding portion comprises:

a first shut-off corresponding portion located between the first connecting port and the second connecting port;

a second shut-off corresponding portion located between the second connecting port and the third connecting port; and a third shut-off corresponding portion located between the third connecting port and the first connecting port.

13. The clothes treatment apparatus of claim 12, wherein the valve is configured in such a way as to select one of a plurality of modes depending on the angle of rotation, the plurality of modes comprising: a first mode in which the shut-off portion makes contact with the first shut-off corresponding portion and the second shut-off corresponding portion but is separated from the third shut-off corresponding portion;

a second mode in which the shut-off portion makes contact with the second shut-off corresponding portion and the third shut-off corresponding portion but is separated from the first shut-off corresponding portion;

and a third mode in which the shut-off portion makes contact with the first shut-off corresponding portion, second shut-off corresponding portion, and third shut-off corresponding portion.

14. The clothes treatment apparatus of claim 11, wherein the valve is configured in such a way as to select one of a plurality of modes depending on the angle of rotation, the plurality of modes comprising:

a first mode in which the valve connects the first connecting port and the third connecting port and shuts off the second connecting port from the first and third connecting ports;

a second mode in which the valve connects the first connecting port and the second connecting port and shuts off the third connecting port from the first and second connecting ports; and a third mode in which the valve shuts off all the connections among the first to third connecting ports.

15. The clothes treatment apparatus of claim 11, wherein the shut-off portion is formed in such a way as to be opened at least at 180 degrees with respect to the rotational axis.

16. The clothes treatment apparatus of claim 1, wherein the valve comprises:

a first shut-off portion that protrudes in a certain centrifugal direction with respect to the rotational axis;

a second shut-off portion that protrudes in the direction opposite to the certain centrifugal direction with respect to the rotational axis; and a third shut-off portion that protrudes in another centrifugal direction, within the range of an angle between the first shut-off portion and the second shut-off portion with respect to the rotational axis.

17. The clothes treatment apparatus of claim 16, wherein the valve further comprises a guide rib that runs across the first shut-off portion, second shut-off portion, and third shut-off portion.

18. The clothes treatment apparatus of claim 1, wherein the valve actuating module comprises a motor for generating torque, and the valve comprises:
   a power shaft portion that is placed on the rotational axis and receives torque from the motor; and
   a stopper that protrudes in a centrifugal direction and restricts the range of rotation of the valve.

19. A clothes treatment apparatus comprising:
   a cabinet forming a treatment space for storing clothes;
   a filter module having a filter portion for filtering out dust from air passing therethrough;
   an air flow path having a plurality of preset flow paths for directing air to be discharged into the treatment space;
   a fan for moving the air in the air flow path;
   a single valve disposed on the air flow path, that changes the air flow path by rotating around a predetermined rotational axis;
   a valve actuating module for rotating the valve; and
   a control part for controlling the angle of rotation of the valve so as to select one of the plurality of flow paths, the plurality of flow paths comprising: a
      bypass circulation flow path for directing air drawn in from inside the treatment space to bypass the filter portion;
      a filtering circulation flow path for directing the air drawn in from inside the treatment space to pass through the filter portion; and
      a ventilation flow path for directing air drawn in from an outer space of the cabinet to pass through the filter portion.

* * * * *